(12) United States Patent
Lee et al.

(10) Patent No.: US 11,144,605 B2
(45) Date of Patent: Oct. 12, 2021

(54) TRANSMITTING CONTENT ITEMS USING SEARCH HISTORY PROFILES

(71) Applicant: Oath Inc., New York, NY (US)

(72) Inventors: Soomin Lee, Sunnyvale, CA (US); Sandeep Thirumalai, Fremont, CA (US); Ben M. Shahshahani, Menlo Park, CA (US); Shreyas Kolkebail Shetty, Milpitas, CA (US); Yair Koren, Zichron Yaacov (IL); Varun Dhananjay Bhatt, Sunnyvale, CA (US); Shakti Prasad Sen, Sunnyvale, CA (US); Sepehr Sahba, Laguna Niguel, CA (US); Rohit Chandra, Los Altos Hills, CA (US)

(73) Assignee: VERIZON MEDIA INC., New York, NY (US)

( * ) Notice: Subject to any disclaimer, the term of this patent is extended or adjusted under 35 U.S.C. 154(b) by 195 days.

(21) Appl. No.: 16/158,656

(22) Filed: Oct. 12, 2018

(65) Prior Publication Data

US 2020/0117760 A1 Apr. 16, 2020

(51) Int. Cl.
*G06F 16/9535* (2019.01)
*G06F 16/242* (2019.01)
*G06F 16/248* (2019.01)
*G06F 16/955* (2019.01)
*G06F 16/2457* (2019.01)

(52) U.S. Cl.
CPC ........ *G06F 16/9535* (2019.01); *G06F 16/243* (2019.01); *G06F 16/248* (2019.01); *G06F 16/24578* (2019.01); *G06F 16/955* (2019.01)

(58) Field of Classification Search
None
See application file for complete search history.

(56) References Cited

U.S. PATENT DOCUMENTS

| 10,496,660 | B1* | 12/2019 | Freund | G06F 16/9537 |
| 2007/0162432 | A1* | 7/2007 | Armstrong | G06F 16/9535 |
| 2008/0215416 | A1* | 9/2008 | Ismalon | G06Q 30/02 |
| | | | | 705/14.54 |
| 2009/0089246 | A1* | 4/2009 | Chi | G06F 16/951 |
| 2011/0184813 | A1* | 7/2011 | Barnes | G06F 16/9535 |
| | | | | 705/14.66 |

(Continued)

*Primary Examiner* — Tony Mahmoudi
*Assistant Examiner* — Umar Mian
(74) *Attorney, Agent, or Firm* — Cooper Legal Group LLC

(57) ABSTRACT

One or more computing devices, systems, and/or methods for transmitting content items using search history profiles are provided. For example, a first request to access a web page may be received. The first request may be associated with a device. The first request may be analyzed to determine a query. The query may be stored in a search history profile associated with the device. The search history profile may comprise indications of a plurality of queries. A second request for content may be received from a second device associated with the search history profile. Responsive to receiving the second request, a content item may be selected from a content items database based upon the query. The content item may be transmitted to the second device. The device may be the same as the second device. Alternatively and/or additionally, the device may be different than the second device.

20 Claims, 15 Drawing Sheets

(56) References Cited

U.S. PATENT DOCUMENTS

| | | | |
|---|---|---|---|
| 2012/0173505 A1* | 7/2012 | Diab | G06F 16/951 |
| | | | 707/706 |
| 2015/0095147 A1* | 4/2015 | Bryce | G06Q 30/0255 |
| | | | 705/14.53 |
| 2015/0095291 A1* | 4/2015 | Subramanya | G06F 16/285 |
| | | | 707/692 |
| 2016/0147888 A1* | 5/2016 | Nguyen | G06F 16/2455 |
| | | | 707/707 |
| 2018/0025010 A1* | 1/2018 | Ramer | G06F 16/7867 |
| | | | 707/727 |
| 2018/0025089 A1* | 1/2018 | Chin | G06F 16/9535 |
| | | | 707/706 |

* cited by examiner

TRANSMITTING CONTENT ITEMS USING SEARCH HISTORY PROFILES

BACKGROUND

Many services, such as websites, applications, etc. may provide platforms for viewing media. For example, a user may interact with a service. Media having first subject matter may be presented to the user while the user interacts with the service. However, the user may not be interested in the first subject matter. Thus, the user may not interact with the media.

SUMMARY

In accordance with the present disclosure, one or more computing devices and/or methods are provided. In an example, a first request to access a web page may be received. The first request may be associated with a first device. The first request may be analyzed to determine a query. A representation of the query may be stored in a search history profile associated with the first device. The search history profile may comprise indications of a plurality of queries. A second request for content may be received from a second device associated with the search history profile. Responsive to receiving the second request for content, a content item may be selected from a content items database based upon the query. The content item may be transmitted to the second device.

In an example, a graphical user interface of a first device may be controlled to display a search interface. A first query may be received, via the search interface, from the first device. Responsive to receiving the first query, the graphical user interface may be controlled to display a plurality of search results corresponding to a plurality of web pages associated with the first query. A selection of a first search result, of the plurality of search results, may be received. The first search result may correspond to a first web page of the plurality of web pages. Responsive to receiving the selection of the first search result, an indication that the first query is linked with the first web page may be stored in a referral query database. A message indicative of a second device accessing the first web page may be received. It may be determined that the second device did not access the first web page via the search interface. Responsive to determining that the second device did not access the first web page via the search interface, the referral query database may be analyzed to determine that the first web page is linked with the first query. Responsive to determining that the first web page is linked with the first query, an indication of the first query may be stored in a search history profile associated with the second device. A request for content may be received from the second device. Responsive to receiving the request for content, a content item may be selected from a content items database based upon the first query. The content item may be transmitted to the second device.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
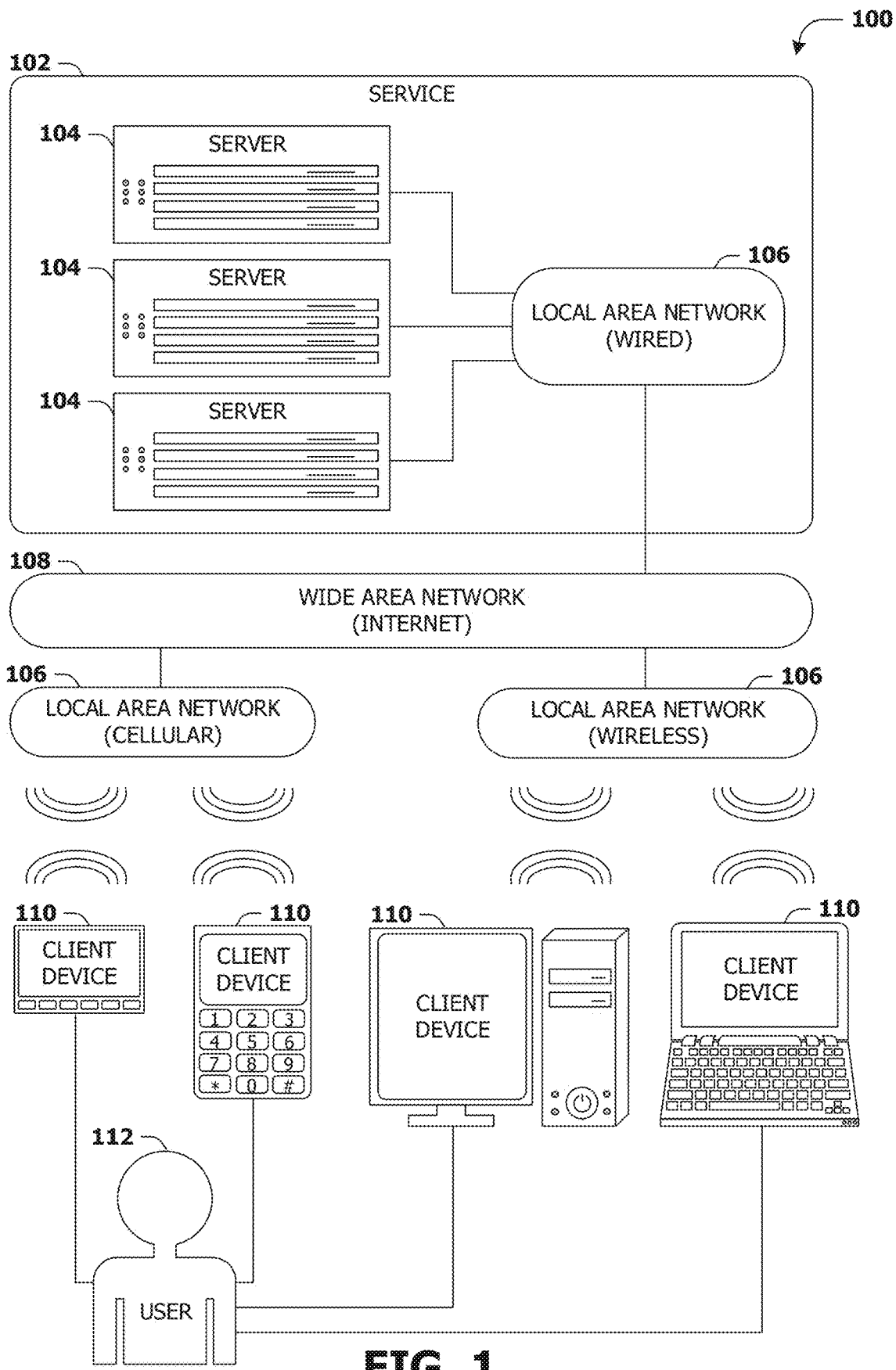
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
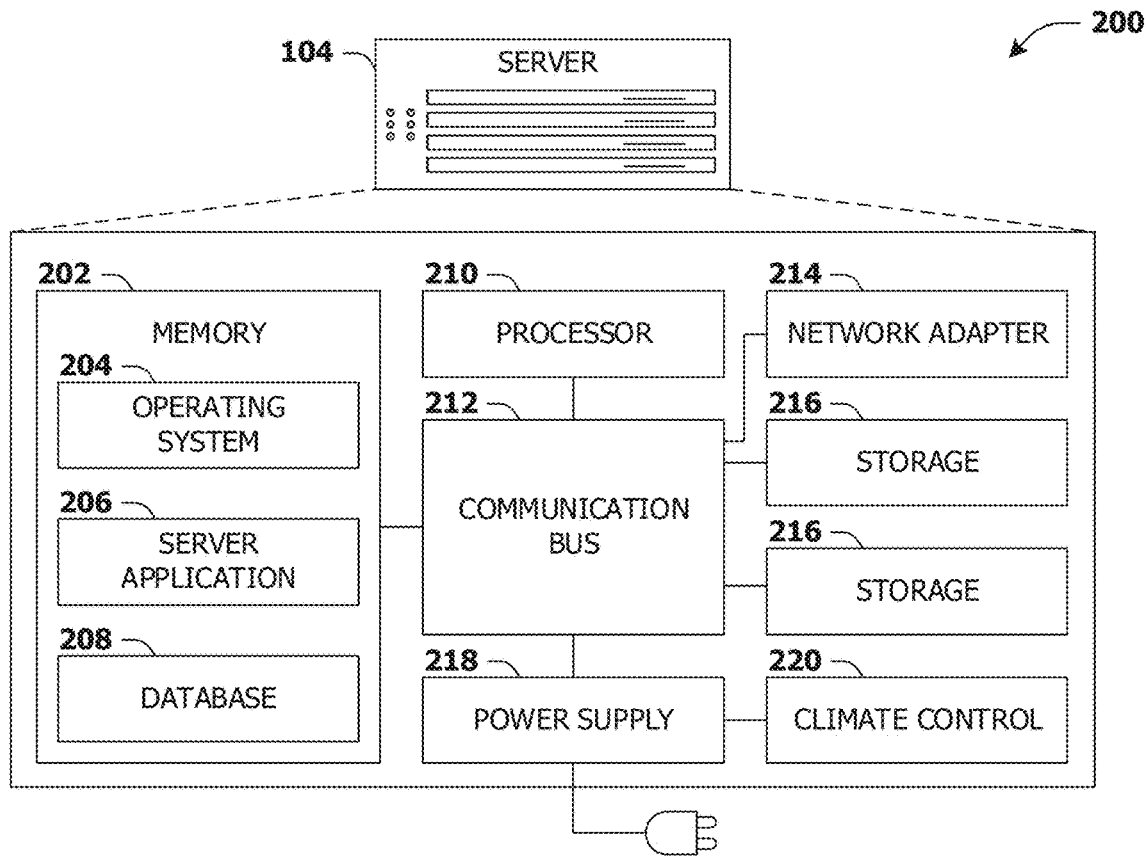
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
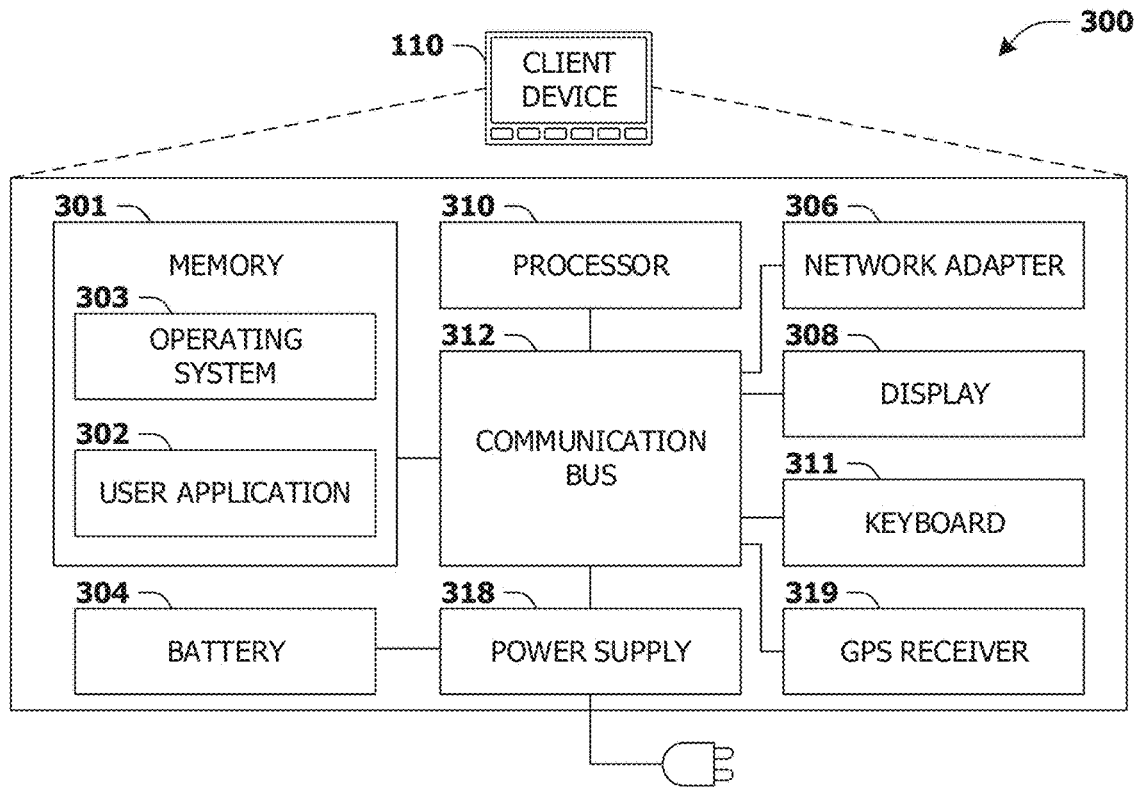
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques are provided for generating search history profiles and/or transmitting content items using the search history profiles. For example, a user may access and/or interact with a service, such as a browser, an application, etc. that provides for viewing and/or downloading content from a server associated with a content system. In some examples, the content system may not have access to search history information associated with the user and/or may have access to limited amounts of search history information associated with the user. For example, the user and/or a client device associated with the user may not perform searches using a search interface associated with the content system. Thus, the content system may not be able to determine search history information associated with the user and/or the client device. For example, a first content item associated with first subject matter may be presented to the user. In an example, the first content item may be a first advertisement advertising one or more car brands (e.g., the first subject matter may be associated with cars). However, the user may not have an interest in the first subject matter. As a result, the user may not interact with the first content item.

Thus, in accordance with one or more of the techniques presented herein, a first request to access a first web page may be received by the content system. For example, the client device may access a search interface. A search may be performed using the search interface based upon a query. A second web page comprising a plurality of search results corresponding to a plurality of web pages may be displayed. A first search result corresponding to the first web page may be selected. A second request to access the first web page may be transmitted by the client device to a second server associated with the first web page. The first request, comprising a representation of the second request, may be transmitted (e.g., forwarded) (by the second server) to the server (associated with the content system). The query may be determined based upon the first request. A representation of the query may be stored in a search history profile associated with the client device. A second request for content may be received from the client device. A second content item may be selected from a content items database based upon the query. The second content item may be transmitted to the client device.

Figure 4A:
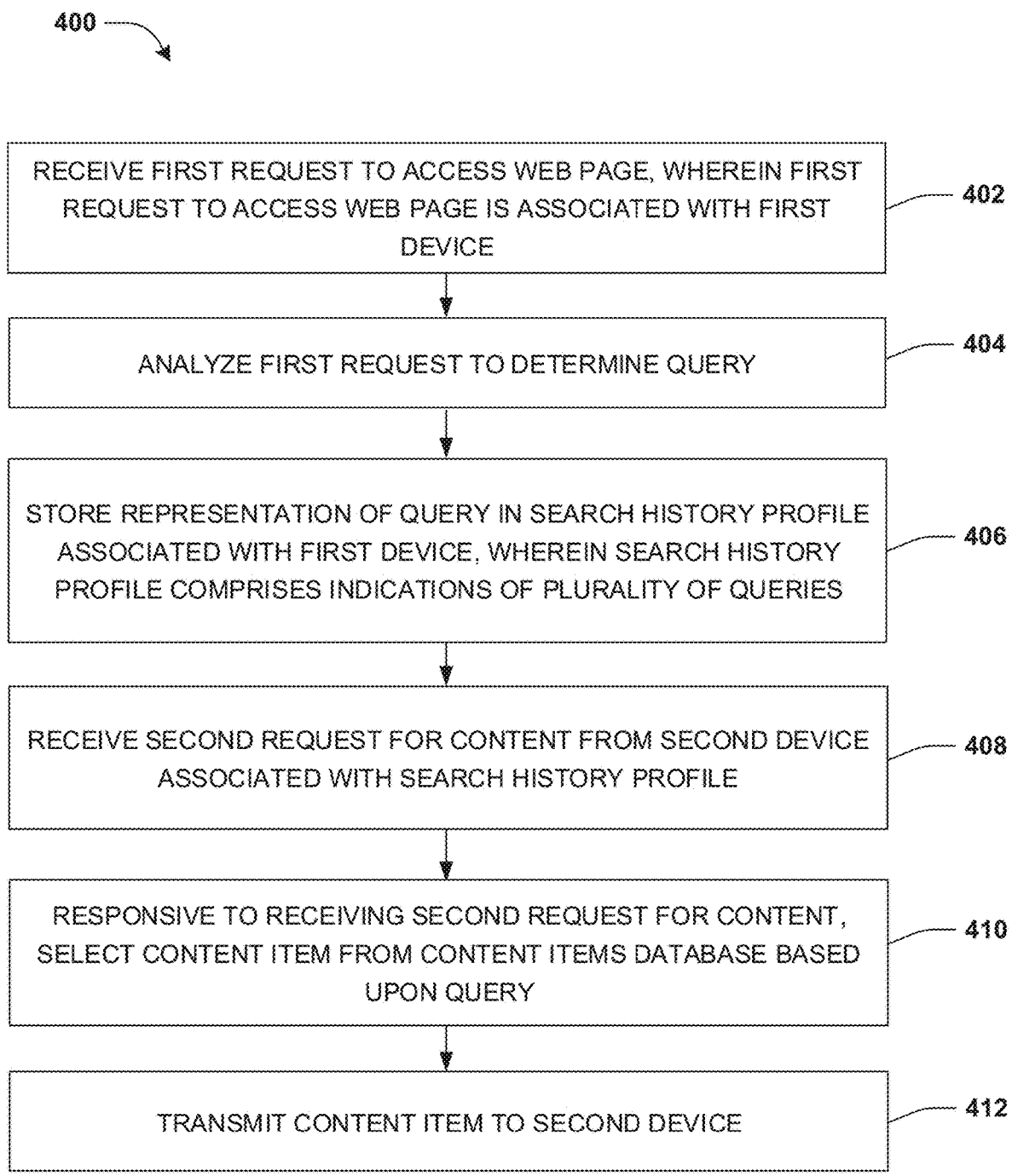
FIG. 4A is a flow chart illustrating an example method for transmitting content items using search history profiles.

An embodiment of transmitting content items using search history profiles is illustrated by an example method 400 of FIG. 4A. A user, such as user Jill, (and/or a client device associated with the user) may access and/or interact with a service, such as a browser, an application (e.g., a web application, a mobile application, etc.), etc. that provides for viewing and/or downloading content from one or more first servers associated with a content system. For example, one or more web pages associated with one or more websites may be accessed by the client device. For example, the one or more websites and/or the one or more web pages may be accessed using the browser of the client device and/or using the application of the client device.

In some examples, the content system may provide content items to be presented via a plurality of web pages associated with the content system. For example, each web page of the plurality of web pages may be associated with a website of a plurality of websites associated with the content system. The content system may be associated with a service for providing content items to be presented in one or more locations throughout web pages of the plurality of web pages (e.g., one or more areas of the plurality of web pages configured for presentation of content items). In some examples, the content system may be associated with an advertising system (e.g., an online advertising system) wherein entities associated with the plurality of websites may receive compensation (e.g., payment) for enabling the content system to provide content items to be presented throughout the web pages of the plurality of websites. Alternatively and/or additionally, the content system may not be associated with an advertising system.

At 402, a first request to access a first web page may be received. The first request to access the web page may be associated with the client device. In some examples, the first request may be received by the one or more first servers associated with the content system. Alternatively and/or additionally, the first request may be transmitted by one or more second servers associated with a first website comprising the first web page.

In some examples, a graphical user interface of the client device may be controlled to display a second web page. The second web page may comprise a search interface. For example, the search interface may be configured for generating search results based upon queries. The search interface may be an internal website search interface designed to search for information comprised within the first website. For example, the second web page and/or the search interface may be associated with the first website. Accordingly, the search results may be associated with the first website (e.g., the search results may correspond to content and/or web pages of the first website).

Alternatively and/or additionally, the search interface may be a web search engine designed to search for information throughout the Internet. For example, the second web page and/or the search interface may be comprised within a second website (e.g., a search engine website). Alternatively and/or additionally, the search results may be associated with a plurality of websites (e.g., the search results may correspond to content and/or web pages of a plurality of websites).

In some examples, a query may be inputted into a search field of the search interface. For example, the query may comprise a set of characters (e.g., "cars", "J brand cars", "j2 cars", "night dress", etc.). Alternatively and/or additionally, the query may be entered into the search field using a touchscreen (of the client device), one or more switches (e.g., one or more buttons, such as buttons of a keyboard), a conversational interface (e.g., a voice recognition and natural language interface), etc. In some examples, the search interface may comprise a search selectable input corresponding to performing a search based upon the query. For example, selection of the search selectable input may cause the search to be performed.

In some examples, the graphical user interface may be controlled to display a plurality of search results associated with the query. For example, the plurality of search results may correspond to a plurality of web pages (e.g., each search result of the plurality of search results may correspond to a web page of the plurality of web pages). In some examples, the plurality of search results may be generated based upon a determination that one or more parts of the query matches one or more parts of each web page of the plurality of web pages. For example, the plurality of search results may be arranged (e.g., organized) based upon levels of relevance to the query. In some examples, the plurality of search results may be presented within a third web page. Alternatively and/or additionally, each search result of the plurality of search results may comprise a selectable input corresponding to accessing a web page associated with the search result.

In some examples, a first search result (of the plurality of search results) corresponding to the first web page may be selected (e.g., the first search result may be selected via a second selectable input corresponding to the first search result). For example, the first search result may be associated with a link to the first web page. In some examples, responsive to the first search result being selected, a second request to access the first web page may be transmitted by the client device to the one or more second servers associated with the first website (comprising the first web page).

In some examples, the second request may comprise a plurality of header fields. For example, the plurality of header fields may be associated with a protocol (e.g., Hypertext Transfer Protocol (HTTP) and/or a different protocol). Alternatively and/or additionally, the second request may comprise an indication of the first web page. For example, the second request may comprise a first web address associated with the first web page. Alternatively and/or additionally, the second request may comprise an indication of the third web page. For example, the plurality of header fields may comprise a referrer web address (e.g., a referrer uniform resource locator (URL) also known as a referrer URL). The referrer web address may be associated with the third web page. For example, the referrer web address may be a second web address associated with the third web page.

In some examples, the referrer web address may be a header field of the plurality of header fields.

In some examples, the second request may comprise an identifier associated with the client device. For example, the identifier may comprise an identification number associated with the client device, a network of the client device, the browser of the client device, the application of the client device, etc. In some examples, the identifier may be comprised within a cookie associated with the client device and/or the user. For example, an indication of the cookie may be comprised within the first request. In some examples, the identifier may comprise an Internet Protocol address (IP address), a media access control address (MAC address), etc.

In some examples, contents of the first request may be the same as contents of the second request. Alternatively and/or additionally, contents of the first request may be different than contents of the second request. In some examples, the first request may be generated (by the one or more second servers) based upon the second request. For example, the first request may comprise a representation of the second request. For example, the first request may comprise one or more parts of the second request. For example, the first request may comprise the first web address, the referrer web address (e.g., the second web address associated with the third web page), the identifier, the cookie (associated with the client device and/or the user) and/or other information comprised within the second request. The first request may be transmitted (by the one or more second servers) to the one or more first servers.

For example, the first website may be comprised within one or more first websites. The content system may be associated with the advertising system wherein entities associated with the one or more first websites may receive compensation for providing information associated with internet activity to the content system. Alternatively and/or additionally, entities associated with the one or more first websites may have an agreement wherein the content system may promote brands and/or products associated with the one or more first websites and/or information associated with internet activity of the one or more first websites may be provided to the content system. For example, servers associated with the one or more first websites may transmit internet activity such as representations of requests to access web pages, product and/or service purchasing activity, product and/or service viewing activity, etc. to the one or more first servers associated with the content system.

At 404, the first request may be analyzed to determine the query. For example, the referrer web address may comprise a first query identifier (also known as query parameter, query_parameter, etc.) and/or a second set of characters associated with the query. In an example, the second web page may correspond to a third web address comprising "www.sunglasses.shop". Alternatively and/or additionally, the query inputted into the search field of the search interface (of the second web page) may be "vintage sunglasses". Accordingly, the referrer web address corresponding to the third web page (comprising the plurality of search results associated with the query), may comprise "www.sunglasses.shop/search.do?searchText=vintage+sunglasses".

In some examples, the first query identifier of the referrer web address may comprise "searchText" (e.g., a string identifying one or more portions of the query). In some examples, the first query identifier may be identified by comparing one or more parts of the referrer web address (e.g., identified by the string) with a list of query identifiers to determine whether the first query identifier is comprised within the list of query identifiers. For example, the list of query identifiers may comprise indications of a plurality of query identifiers. For example, the query identifier may be identified by determining that a part of the referrer web address comprising "searchText" matches the first query identifier of the plurality of query identifiers. Each query identifier of the plurality of query identifiers may correspond to one or more domains corresponding to one or more websites of one or more first websites (and/or other websites) associated with the content system.

In some examples, the list of query identifiers may be arranged (e.g., organized) based upon frequencies of domain usage of the plurality of query identifiers. For example, a frequency associated with each query identifier (e.g., a number of domains that comprise the query identifier for indicating queries) may be determined. The list of query identifiers may be arranged based upon the frequencies. For example, a second query identifier associated with a first frequency that is higher than a second frequency of a third query identifier may be above the third query identifier in the list of query identifiers. Alternatively and/or additionally, the list of query identifiers may comprise two sections. For example, a first section of the list of query identifiers may comprise a first set of query identifiers of the plurality of query identifiers associated with frequencies higher than a frequency threshold. Alternatively and/or additionally, a second section of the list of query identifiers may comprise a second set of query identifiers of the plurality of query identifiers associated with frequencies lower than the frequency threshold. Alternatively and/or additionally, the list of query identifiers may comprise three or more sections, wherein each section of the three or more sections may comprise a set of query identifiers associated with frequencies within a frequency range.

In an example, the first query identifier (e.g., "searchText") of the referrer web address may be associated with a third frequency (e.g., a first number of domains that comprise the first query identifier to indicate queries). Alternatively and/or additionally, a fourth query identifier may be associated with a fourth frequency (e.g., a second number of domains that comprise the second query identifier to indicate queries). For example, the third frequency may be higher than the fourth frequency. Accordingly, the list of query identifiers may comprise the first query identifier above the fourth query identifier. In some examples, one or more parts of the referrer web address may be compared with the plurality of query identifiers sequentially in order of frequency, such that query identifiers associated with higher frequencies are compared with the referrer web address before query identifiers associated with lower frequencies. Responsive to determining that the part of the referrer web address comprising "searchText" matches the first query identifier, the content system may stop comparing the referrer web address with query identifiers of the plurality of query identifiers. Thus, the referrer web address may not be compared with the fourth query identifier.

In some examples, the second set of characters associated with the query may comprise "vintage+sunglasses". For example, the second set of characters may be identified based upon a location of the second set of characters, in the referrer web address, with respect to the first query identifier (e.g., the first query identifier may be followed by the second set of characters in the referrer web address). In some examples, the query (e.g., "vintage sunglasses") may be determined based upon the second set of characters (e.g., "vintage+sunglasses"). For example, one or more characters (e.g., "+") may be removed from the second set of characters to generate the query.

In some examples, a first domain associated with the referrer web address may be determined. Responsive to a determination that the first domain merely comprises digits (e.g., numbers) and/or that the first domain does not comprise letters and/or other non-digit characters, the first domain may be discarded and/or the referrer web address may not be analyzed to determine the query and/or the query identifier.

Alternatively and/or additionally, a first set of labels of the first domain may be determined. Responsive to a determination that a first label of the first set of labels of the first domain merely comprises digits and/or that the first label does not comprise letters and/or other non-digit characters, a first portion of the referrer web address comprising the first label may be discarded and/or merely a second portion of the referrer web address excluding the first label may be analyzed to determine the query and/or the query identifier. In an example, the first domain may comprise "3245.sunglasses.shop". Thus, the first portion "3245" comprising the first label that merely comprises digits may be discarded.

Alternatively and/or additionally, responsive to a determination that a second label of the first set of labels of the first domain begins with digits, a third portion of the referrer web address comprising the second label may be discarded and/or merely a fourth portion of the referrer web address excluding the second label may be analyzed to determine the query and/or the query identifier.

In some examples, rather than determining the query based upon the referrer web address, the query may be generated based upon the first web address associated with the first web page. For example, the first web address may comprise an indication of an item, such as a product and/or a service. For example, the first web address may comprise "www.sunglasses.shop/product/vintage-sunglasses-james-sunglassville". Accordingly, the item may comprise a product named "GBQ vintage sunglasses". Thus, the query may be generated comprising an indication of the item associated with the first web address. For example, the query may comprise "GBQ vintage sunglasses". In some examples, the query may be generated based upon the first web address responsive to a determination that the referrer web address does not comprise a query identifier and/or an indication of the query and/or a determination that the third web page (associated with the referrer web address) does not comprise search results generated based upon the query.

Alternatively and/or additionally, rather than determining the query based upon the referrer web address, the query may be determined based upon the first web address associated with the first web page. For example, the indication of the item comprised within the first web address may comprise an item identifier (e.g., a product identification code). For example, the item identifier may comprise a set of letters and/or numbers that may be assigned to the first web page, a product and/or a service. In some examples, a search history profile database may be analyzed to determine the query based upon the item identifier and/or the first web address.

For example, the search history profile database may comprise a plurality of search history profiles associated with a plurality of identifiers. Each identifier of the plurality of identifiers may be associated with a network, a device, a cookie, a user identifier, etc. associated with a search history profile of the plurality of search history profiles. In some examples, search history profiles of the plurality of search history profiles may comprise queries determined based upon referrer web addresses. For example, the search history profiles of the plurality of search history profiles may further comprise indications of web address of web pages accessed via search results associated with the referrer web addresses.

Alternatively and/or additionally, the search history profiles of the plurality of search history profiles may comprise indications of item identifiers associated with web pages accessed via search results associated with the referrer web addresses. For example, item identifiers and/or the indications of web addresses of web pages may be stored in search history profiles of the plurality of search history profiles. Alternatively and/or additionally, indications that the item identifiers and/or that the web addresses are linked with queries may be stored in search history profiles of the plurality of search history profiles (e.g., the queries may be determined based upon referrer web addresses).

For example, the search history profile database may be analyzed based upon the item identifier and/or the first web address to identify an indication of the item identifier and/or the first web address in a second search history profile of the search history profile database. For example, the second search history profile of the search history profile database may comprise an indication that the first web page and/or the item identifier is linked with a fifth query (e.g., that the first web page and/or a different web page associated with the item identifier was accessed by a third client device via search results generated based upon the fifth query). For example, the second search history profile may comprise an indication that the third client device accessed the first web page associated with the item identifier via search results generated based upon the fifth query, wherein the fifth query may be determined based upon a second referrer web address associated with the third client device accessing the first web page. Accordingly, responsive to a determination that the first web page and/or the item identifier is linked with the fifth query, the query may be generated comprising an indication of the fifth query.

At 406, a representation of the query may be stored in a search history profile associated with the first device. Alternatively and/or additionally, a representation of the referrer web address may be stored in the search history profile. Alternatively and/or additionally, a representation of the first web address may be stored in the search history profile. In some examples, the search history profile may be associated with a user identification. For example, the search history profile may be identified based upon a determination that the identifier associated with the first device corresponds to the search history profile. In some examples, the search history profile may comprise indications of a plurality of queries associated with the first device. Alternatively and/or additionally, the search history profile may not comprise indications of the plurality of queries and/or may be generated based upon the query.

In some examples, the query may be analyzed to determine one or more misspellings of the query. For example, the one or more misspellings may be corrected (e.g., one or more letters and/or symbols of the query may be removed, one or more letters and/or symbols of the query may be replaced with one or more different letters and/or symbols, one or more letters and/or symbols may be added to the query, etc.) to generate a modified query. For example, the representation of the query (stored in the search history profile) may comprise and/or be linked to the modified query.

Alternatively and/or additionally, the query may be compared with a second plurality of queries associated with a content items database. For example, the content items database may comprise content items associated with the content system. The content items database may be stored on the one or more first servers. Each content item of the content items database may be linked with one or more identifiers identifying one or more queries of the second plurality of queries associated with the content item, one or more topics associated with the content item, a category associated with the content item, one or more interests of a target audience associated with the content item, one or more demographic parameters of the target audience associated with the content item, one or more specifications of a file-size, file-type, etc. of the content item, etc.

In some examples, the query may be determined to be similar to and/or to match a second query of the second plurality of queries. For example, one or more characters of the query may match one or more characters of the second query and/or one or more meanings (e.g., definitions) associated with the query may match one or more meanings associated with the second query. In some examples, the representation of the query may comprise the second query. Alternatively and/or additionally, the representation of the query may comprise one or more identifiers identifying a set of content items associated with the second query and/or one or more categories of content items associated with the second query.

Alternatively and/or additionally, a first location associated with the client device may be determined. For example, the first location may be determined based upon the identifier (e.g., the IP address, the MAC address, etc.). In some examples, the representation of the query may be stored in the search history profile responsive to a determination that the location is within a first area (e.g., within one or more countries, within one or more states, within one or more provinces, within one or more regions, etc.). Alternatively and/or additionally, the query and/or the representation of the query may be discarded and/or may not be stored in the search history profile responsive to a determination that the location is not within the first area.

Alternatively and/or additionally, one or more characteristics associated with the cookie (e.g., a browser cookie string) may be determined. For example, the cookie may be analyzed to determine whether the cookie is a null cookie and/or whether the cookie is valid. For example, responsive to a determination that the cookie is a null cookie and/or that the cookie is not valid, the query and/or the representation of the query may be discarded and/or may not be stored in the search history profile. Alternatively and/or additionally, responsive to the determination that the cookie is a null cookie and/or that the cookie is not valid, the search history profile may be discarded.

Alternatively and/or additionally, a search volume associated with the user identification, the cookie and/or the first device may be determined. For example, the search volume may correspond to a number of queries associated with the user identification, the cookie and/or the first device that are searched and/or generated within a time period (e.g., within one or more hours, within one or more days, etc.). Responsive to a determination that the search volume is higher than a search volume threshold, the query and/or the representation of the query may be discarded and/or may not be stored in the search history profile. Alternatively and/or additionally, responsive to the determination that the search volume is higher than the search volume threshold, the search history profile may be discarded. In some examples, the search volume threshold may be configured such that human search activity may not exceed the search volume and/or such that search activity performed by executing one or more computing systems (e.g., one or more robots) may exceed the search volume.

Alternatively and/or additionally, search patterns associated with the user identification, the cookie and/or the first device may be determined. For example, responsive to determining that the search patterns are indicative of non-human search activity (e.g., search activity executed by one or more computing systems, search activity executed by one or more robots), the query and/or the representation of the query may be discarded and/or may not be stored in the search history profile. Alternatively and/or additionally, responsive to determining that the search activity patterns are indicative of non-human search activity, the search history profile may be discarded.

In some examples, a filtering process may be performed to determine whether the query and/or the representation of the query should be discarded or stored in the search history profile. For example, the search history profile may be analyzed to determine whether a previous query (previously stored in the search history profile) matching the query and/or the representation of the query is comprised within the search history profile. For example, responsive to a determination that a previous query, matching the query and/or the representation of the query, is comprised within the search history profile, the query and/or the representation of the query may be discarded and/or may not be stored in the search history profile.

In some examples, a level of association of the query with content items of the content items database may be determined. For example, the level of association may be determined based upon a comparison of the query with topics associated with content items of the content items database, categories associated with content items of the content items database, interests associated with target audiences associated with content items of the content items database, etc. In some examples, the representation of the query may be stored in the search history profile responsive to a determination that the level of association is higher than a threshold level of association. Alternatively and/or additionally, the query and/or the representation of the query may be discarded and/or may not be stored in the search history profile responsive to a determination that the level of association is less than the threshold level of association. The level of association may be based upon a number (e.g., quantity) of matches between the query and content items of the content items database and/or based upon a strength and/or level of similarity (e.g., quality) of matches between the query and content items of the content items database.

Alternatively and/or additionally, a search frequency associated with the query among a plurality of devices may be determined. For example, the search frequency may correspond to an amount of searches associated with the query performed using one or more search interfaces. For example, the search frequency may correspond to an amount of searches associated with the query performed using the one or more search interfaces per day, per week, etc. Responsive to a determination that the search frequency is higher than a search frequency threshold, the query and/or the representation of the query may be discarded and/or may not be stored in the search history profile. In some examples, the search frequency may be configured such that navigational queries (e.g., queries used to navigate to one or more pre-determined websites) are discarded.

Alternatively and/or additionally, the query may be analyzed to determine whether the query comprises a web address. For example, responsive to a determination that the query comprises a web address, the query and/or the representation of the query may be discarded and/or may not be stored in the search history profile.

Alternatively and/or additionally, the query may be analyzed to determine whether the query comprises a non-American Standard Code for Information Interchange (ASCII) character (e.g., or a character that does not correspond to one or more other defined codes). For example, responsive to a determination that the query comprises a non-ASCII character, the query and/or the representation of the query may be discarded and/or may not be stored in the search history profile.

Alternatively and/or additionally, the query may be analyzed to determine a number of words comprised within the query. For example, responsive to a determination that the number of words of the query is higher than a maximum number of words (e.g., 10 words, 15 words, etc.), the query and/or the representation of the query may be discarded and/or may not be stored in the search history profile.

Alternatively and/or additionally, the query may be analyzed to determine a number of characters comprised within the query. For example, responsive to a determination that the number of characters of the query is higher than a maximum number of characters (e.g., 100 characters, 150 characters, etc.), the query and/or the representation of the query may be discarded and/or may not be stored in the search history profile. Alternatively and/or additionally, responsive to a determination that the number of characters is less than a minimum number of characters (e.g., 1 character, 2 characters, 3 characters, 5 characters), the query and/or the representation of the query may be discarded and/or may not be stored in the search history profile.

Alternatively and/or additionally, the query may be analyzed to determine whether the query comprises merely a single alphanumeric word (e.g., the query comprises merely a single word comprising one or more letters and one or more digits). For example, responsive to a determination that the query comprises merely a single alphanumeric word, the query and/or the representation of the query may be discarded and/or may not be stored in the search history profile.

Alternatively and/or additionally, the query may be analyzed to determine whether the query comprises merely a set of digits (e.g., the query does not comprise letters and/or other non-digit characters). For example, responsive to a determination that the query comprises merely a set of digits, the query and/or the representation of the query may be discarded and/or may not be stored in the search history profile.

Alternatively and/or additionally, the query may be analyzed to determine whether the query is blacklisted (e.g., a blacklisted query may comprise one or more words associated with content considered unsuitable for minors, one or more special characters, etc.). For example, the query may be compared with a list of blacklisted words to determine whether the query comprises one or more blacklisted words of the list of blacklisted words. Alternatively and/or additionally, the query may be analyzed to determine whether the query comprises one or more special characters. In some examples, responsive to a determination that the query comprises one or more blacklisted words and/or that the query comprises one or more special characters, the query and/or the representation of the query may be discarded and/or may not be stored in the search history profile.

Alternatively and/or additionally, a first monetization score may be assigned to the query. The first monetization score may be determined based upon a cost per thousand impressions (CPM) (e.g., cost-per-mille) associated with the query. For example, the CPM may be determined using a first equation:

$$CPM = \frac{\text{cost}(c)}{\text{\#impressions}} \times 1000,$$

where cost(c) may correspond to cost paid by an advertiser for a click and/or # impressions may correspond to a number of impressions associated with the query.

In some examples, a second set of content items associated with the query may be determined based upon the content items database. In some examples, the CPM may be determined based upon activity associated with the second set of content items and/or the query.

Alternatively and/or additionally, the first monetization score may be determined based upon an effective cost per thousand impressions (eCPM) associated with the query. For example, the eCPM may be determined using a second equation:

$$CPM = \frac{\sum_{c \in C} \text{cost}(c)}{\text{\#impressions}} \times 1000,$$

where C may correspond to a plurality of clicks associated with the query and/or the second set of content items that occurred during a time period (e.g., a day, a week, etc.).

In some examples, responsive to a determination that the first monetization score is less than a threshold monetization score, the query and/or the representation of the query may be discarded and/or may not be stored in the search history profile.

In some examples, an auditing process may be performed to determine whether determinations to store first queries in search history profiles and/or determinations to discard second queries are correct. For example, responsive to a determination that one or more queries of the first queries should be discarded, the filtering process may be modified. Alternatively and/or additionally, responsive to a determination that one or more queries of the second queries should be stored in one or more search history profiles, the filtering process may be modified.

In some examples, in order to store the representation of the query in the search history profile, the representation of the query may be placed in a query queue. For example, the query queue may comprise a third plurality of queries. The third plurality of queries may be stored in the search history profile database sequentially (e.g., in an order based upon the queue). For example, the third plurality of queries may be stored in search history profiles corresponding to the third plurality of queries, sequentially.

In some examples, the search history profile database may be used to select content items for transmission to devices based upon search history profiles within the search history profile. However, due to limitations of the content system, the search history profile database may not be read from and/or may not be analyzed while queries are being stored in (e.g., written into) the search history profile database. Thus, responsive to a determination that the search history profile database is not being read from, queries of the query queue may be stored in the search history profile database. Responsive to a determination that the content system will read from the search history profile database and/or select a content item for transmission to a device based upon the search history profile database, the storing of queues of the query queue in the search history profile database may be halted until the search history profile database is not being read from.

In some examples, a second client device may be associated with the search history profile, the user and/or the network of the client device. In some examples, a fourth web page may be accessed by the second client device. For example, the fourth web page may be accessed using a second browser of the second client device, a second application of the second client device, etc.

In some examples, the fourth web page may be accessed responsive to a selection of a second link to the fourth web page. For example, the second link to the fourth web page may be comprised within a document, text, a web page, etc. The second link to the fourth web page may be selected using a second touchscreen (of the second client device), one or more second switches (e.g., one or more buttons), a second conversational interface (e.g., a voice recognition and natural language interface), etc. Alternatively and/or additionally, the fourth web page may be accessed responsive to inputting a fourth web address (e.g., a URL) corresponding to the fourth web page. For example, the fourth web address may be inputted into an address bar (of the second browser, the second application, etc.) using the second touchscreen, the one or more second switches, the second conversational interface, etc.

In some examples, the fourth web page may be associated with the content system. The content system may provide content items to be presented via the fourth web page (and/or other web pages associated with the content system). At 408, a third request for content may be received from the second client device. In some examples, the second client device may be the same as the client device. Alternatively and/or additionally, the second client device may be different than the client device. In some examples, the second client device may be associated with the profile, the user and/or the network of the client device. In some examples, the third request may comprise the identifier and/or a second identifier associated with the second client device, a second network of the second client device, the second browser of the second client device, the second application of the second client device, etc. In some examples, the second network may be the same as the network (of the client device). Alternatively and/or additionally, the second network may be different than the network.

In some examples, the third request may be transmitted (e.g., to the one or more first servers associated with the content system) by the second client device, responsive to accessing the fourth web page. Alternatively and/or additionally, the third request may be transmitted to the one or more first servers (associated with the content system) by one or more third servers (associated with the fourth web page), responsive to the second client device accessing the fourth web page. In some examples, the third request may comprise an indication of the fourth web page. For example, the third request may comprise the fourth web address.

At 410, responsive to receiving the third request for content, a first content item may be selected from the content items database based upon the query. Alternatively and/or additionally, the first content item may be selected from the content items database based upon the plurality of queries comprised within the search history profile. For example, the plurality of queries comprised within the search history profile may be ranked (based upon levels of association with content items of the content items database, based upon monetization scores associated with the plurality of queries, etc.). In some examples, the query may be ranked higher than other queries of the plurality of queries. Accordingly, the first content item may be selected from the content items database based upon the query (e.g., a subject matter of the first content item may be determined to match and/or be associated with the query and/or the representation of the query).

At 412, the first content item may be transmitted to the second client device. For example, the first content item may be presented to the user (and/or a second user) via the second client device (automatically while the fourth web page is accessed by the second client device and/or while the user and/or the second user interacts with the fourth web page).

Figure 4B:
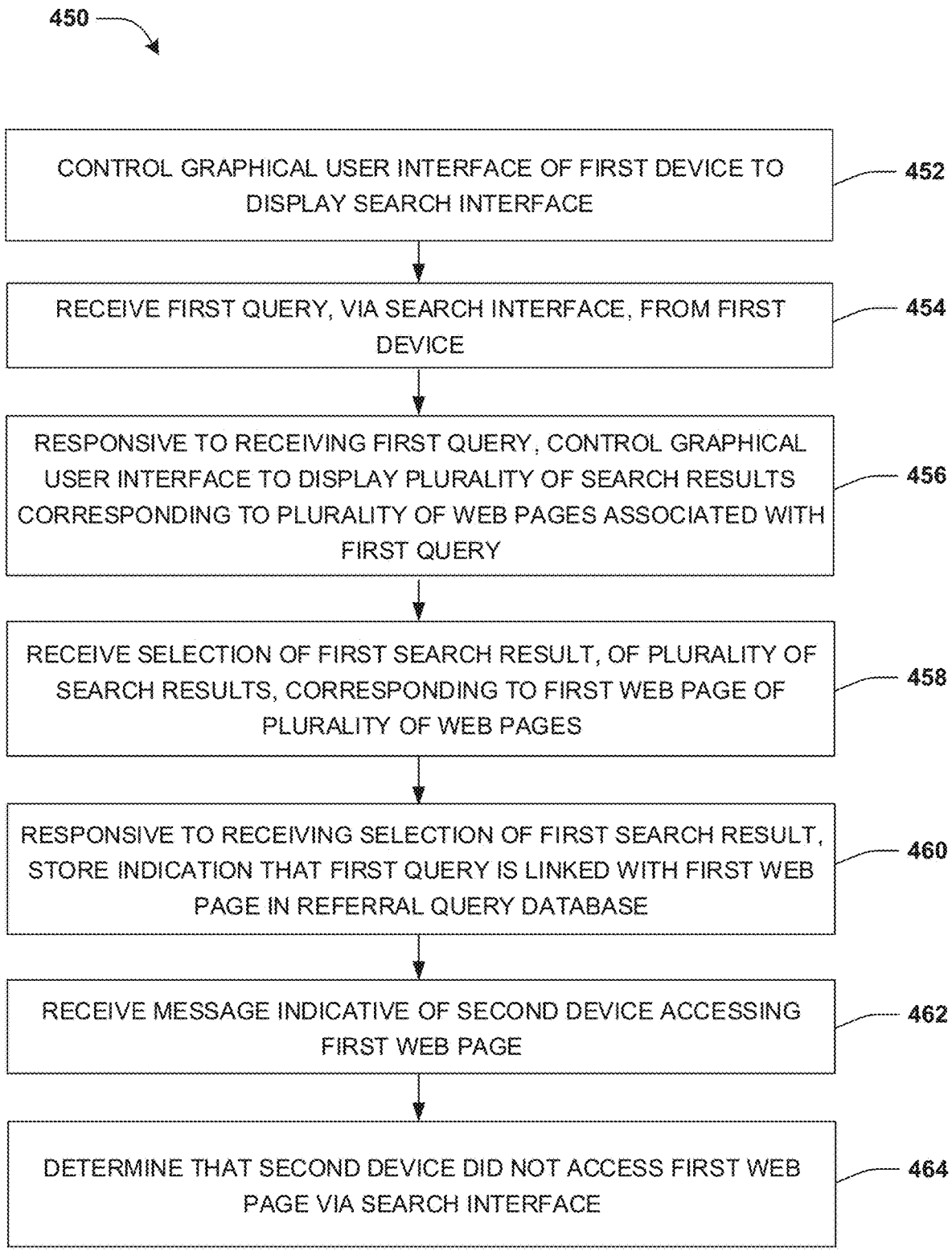
FIG. 4B is a first part of a flow chart illustrating an example method for transmitting content items using search history profiles.
Figure 4C:
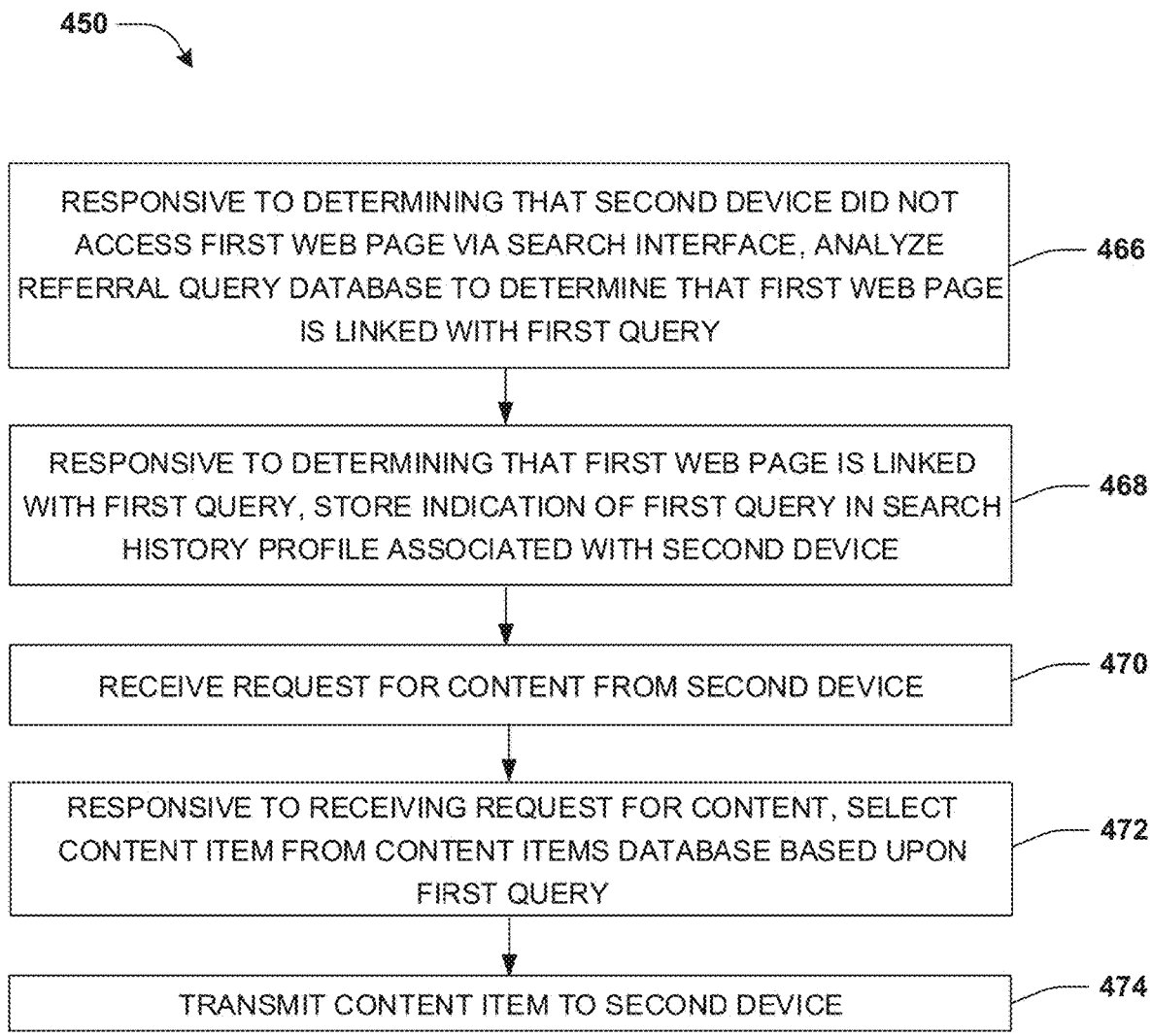
FIG. 4C is a second part of a flow chart illustrating an example method for transmitting content items using search history profiles.

An embodiment of transmitting content items using search history profiles is illustrated by an example method 450 of FIGS. 4B-4C. A user, such as user James, (and/or a client device associated with the user) may access and/or interact with a service, such as a browser, an application (e.g., a web application, a mobile application, etc.), etc. that provides for viewing and/or downloading content from one or more first servers associated with a content system. For example, one or more web pages (of one or more websites) may be accessed by the client device. For example, the one or more websites and/or the one or more web pages may be accessed using the browser of the client device and/or using the application of the client device.

In some examples, the content system may provide content items to be presented via a plurality of web pages associated with the content system. For example, each web page of the plurality of web pages may be associated with a website of a plurality of websites associated with the content system. The content system may be associated with a service for providing content items to be presented in one or more locations throughout web pages of the plurality of web pages (e.g., one or more areas of the plurality of web pages configured for presentation of content items). In some examples, the content system may be associated with an advertising system (e.g., an online advertising system) wherein entities associated with the plurality of websites may receive compensation (e.g., payment) for enabling the content system to provide content items to be presented throughout the web pages of the plurality of websites. Alternatively and/or additionally, the content system may not be associated with an advertising system.

At 452, a graphical user interface of the client device may be controlled to display a search interface. For example, a first web page may be accessed by the client device. The first web page may comprise the search interface. In some examples, the search interface may be configured for generating search results based upon queries. For example, the search interface may be an internal website search interface designed to search for information and/or web pages comprised within merely a first website associated with the first web page. Alternatively and/or additionally, the search interface may be a web search engine designed to search for information throughout the Internet. In some examples, the first web page, the first website and/or the search engine may be associated with the content system.

At 454, a first query may be received, via the search interface, from the client device. For example, the first query may be inputted into a search field of the search interface. For example, the first query may be inputted into the search field using a touchscreen (of the client device), one or more switches (e.g., one or more buttons, such as buttons of a keyboard), a conversational interface (e.g., a voice recognition and natural language interface), etc. In some examples, the search interface may comprise a search selectable input corresponding to performing a search based upon the first query. For example, the first query may be received from the client device responsive to a selection of the search selectable input.

At 456, responsive to receiving the first query, the graphical user interface may be controlled to display a plurality of search results corresponding to a plurality of web pages associated with the query. For example, each search result of the plurality of search results may correspond to a web page of the plurality of web pages. In some examples, the plurality of search results may be generated based upon a determination that one or more parts of the first query matches one or more parts of each web page of the plurality of web pages. For example, the plurality of search results may be arranged (e.g., organized) based upon levels of relevance to the first query. In some examples, the plurality of search results may be presented within a second web page. Alternatively and/or additionally, each search result of the plurality of search results may comprise a selectable input corresponding to accessing a web page associated with the search result.

At 458, a selection of a first search result, of the plurality of search results, may be received. Alternatively and/or additionally, the selection of the first search result may be detected (e.g., using one or more activity detection techniques, such as click event detection). The first search result may correspond to a third web page of the plurality of web pages. In some examples, the selection of the first search result may be received via a selection of a second selectable input corresponding to the first search result. For example, the first search result and/or the second selectable input may be associated with a link to the third web page. In some examples, responsive to the selection of the first search result, the graphical user interface of the client device may be controlled to display the third web page.

At 460, responsive to receiving (and/or detecting) the selection of the first search result, an indication that the first query is linked with the third web page may be stored in a referral query database. For example, the referral query database may comprise a plurality of sets of queries, wherein each set of queries (e.g., a set of one or more queries) may correspond to a web page of a second plurality of web pages associated with the referral query database. For example, the referral query database may comprise a first set of queries, of the plurality of sets of queries, associated with the third web page. For example, the first set of queries may comprise the first query. For example, the first set of queries may comprise one or more queries, wherein each query of the one or more queries may be included in the first set of queries based upon a determination that a set of search results comprising a link to the third web page was generated based upon the query and/or that a selection of a search result of the set of search results corresponding to the link to the third web page was received and/or detected.

For example, the referral query database may comprise indications of a plurality of web addresses associated with the second plurality of web pages. For example, each web address of the plurality of web addresses may be linked with a set of queries of the plurality of sets of queries. For example, the referral query database may comprise an indication of a first web address associated with the third web page. Alternatively and/or additionally, the first web address may be linked with the first set of queries.

In some examples, a filtering process may be performed to determine whether the first query should be discarded or stored in the referral query database. For example, the filtering process may be performed based upon a search frequency associated with the first query, whether the first query comprises a web address, whether the first query comprises a non-ASCII character, a number of words comprised within the first query, a number of characters comprised within the first query, whether the first query comprises merely a single alphanumeric word, whether the first query comprises merely a set of digits and/or whether the first query is blacklisted.

Alternatively and/or additionally, the filtering process may be performed based upon a first monetization score associated with the first query. For example, the first monetization score may be determined based upon a CPM associated with the first query. For example, the CPM may be determined using a first equation:

$$CPM = \frac{\text{cost}(c)}{\#\text{impressions}} \times 1000,$$

where cost(c) may correspond to cost paid by an advertiser for a click and/or # impressions may correspond to a number of impressions associated with the first query.

In some examples, a set of content items associated with the query may be determined based upon a content items database. For example, the content items database may comprise a plurality of content items linked to identifiers associated with a plurality of queries. In some examples, the CPM may be determined based upon activity associated with the set of content items.

Alternatively and/or additionally, the first monetization score may be determined based upon a eCPM associated with the first query. For example, the eCPM may be determined using a second equation:

$$CPM = \frac{\sum_{c \in C} \text{cost}(c)}{\#\text{impressions}} \times 1000,$$

where C may correspond to a plurality of clicks associated with the first query and/or the set of content items that occurred during a time period (e.g., a day, a week, etc.).

In some examples, the first query and/or the indication that the first query is linked with the third web page may be stored in the referral query database responsive to a determination that the first monetization score is higher than a threshold monetization score. Alternatively and/or additionally, responsive to a determination that the first monetization score is less than the threshold monetization score, the first query may be discarded and/or may not be stored in the referral query database.

In some examples, a second graphical user interface of a second client device (associated with a second user) may be controlled to display the search interface. A second query may be received, via the search interface, from the second client device. Responsive to receiving the second query, the second graphical user interface may be controlled to display a second plurality of search results corresponding to a third plurality of web pages. A selection of a second search result, of the second plurality of search results, may be received and/or detected. The second search result may correspond to the third web page. For example, the second search result may be associated with a link to the third web page. Responsive to receiving (and/or detecting) the selection of the second search result, an indication that the second query is linked to with the third web page may be stored in the referral query database. For example, the second query may be included in the first set of queries associated with the third web page.

At 462, a message indicative of a third client device accessing the third web page may be received. In some examples, the third web page may be associated with the content system. In some examples, the third web page may be accessed by the third client device responsive to a selection of a link to the third web page. For example, the link to the third web page may be comprised within a document, text, a web page, etc. The link to the third web page may be selected using a second touchscreen (of the third client device), one or more second switches (e.g., one or more buttons), a second conversational interface (e.g., a voice recognition and natural language interface), etc. Alternatively and/or additionally, the third web page may be accessed responsive to inputting the first web address corresponding to the third web page. For example, the first web address may be inputted into an address bar (of a second browser associated with the third client device, a second application associated with the third client device, etc.) using the second touchscreen, the one or more second switches, the second conversational interface, etc.

In some examples, the message (indicative of the third client device accessing the third web page) may be comprised within a request to access the third web page. Alternatively and/or additionally, the message may comprise an identifier associated with the third client device. For example, the identifier may comprise an identification number associated with the third client device, a network of the third client device, the second browser of the third client device, the second application of the third client device, etc. In some examples, the identifier may be comprised within a cookie associated with the third client device and/or a third user associated with the third client device). For example, an indication of the cookie may be comprised within the message. In some examples, the identifier may comprise an IP address, a MAC address, etc.

At 464, it may be determined that the third client device did not access the third web page via the search interface. For example, search history profile database may be analyzed to determine whether the search history profile database comprises a search history profile associated with the third client device and/or the identifier. In some examples, it may be determined that the search history profile database does not comprise a search history profile associated with the third client device and/or the identifier. Alternatively and/or additionally, it may be determined that the search history profile database comprises a search history profile associated with the third client device that does not comprise an indication of a query associated with the third web page.

At 466, responsive to determining that the third client device did not access the third web page via the search interface, the referral query database may be analyzed to determine that the third web page is linked with the first query. Alternatively and/or additionally, the referral query database may be analyzed to determine that the third web page is linked with the first set of queries (e.g., comprising the first query, the second query and/or one or more other queries associated with the third web page).

At 468, responsive to determining that the third web page is linked with first query, an indication of the first query may be stored in a first search history profile associated with the third client device. Alternatively and/or additionally, responsive to determining that the third web page is linked with the first set of queries, one or more indications of the first set of queries may be stored in the first search history profile. In some examples, the indication of the first query (and/or the one or more indications of the first set of queries) may be stored in the first search history profile responsive to a determination that the first search history profile comprises less than a threshold amount of queries (e.g., less than 1 query, less than 2 queries, less than 3 queries, etc.).

In some examples, merely a second threshold amount of queries (e.g., 1 query, 3 queries, 4 queries, etc.) may be stored in the first search history profile. Alternatively and/or additionally, inclusion of the first set of queries into the first search history profile may result in the first search history profile comprising more than the second threshold amount of queries.

For example, prior to receiving the message indicative of the third client device accessing the third web page, the first search history profile may comprise a second set of queries (e.g., a second set of one or more queries). Alternatively and/or additionally, prior to receiving the message, the first search history profile may not comprise the second set of queries. In some examples, the first set of queries may comprise a first amount of queries. Alternatively and/or additionally, prior to receiving the message, the first search history profile may comprise a second amount of queries (e.g., the second amount of queries may be 0 and/or may be higher than 0). A combination (e.g., a sum) of the first amount of queries and the second amount of queries may be higher than the second threshold amount of queries.

Accordingly, a plurality of queries comprising the first set of queries and/or the second set of queries may be ranked in order to select a third set of queries (e.g., a third set of one or more queries) for inclusion in the first search history profile based upon the second threshold amount of queries. For example, the third set of selectable inputs may comprise an amount of queries associated with the second threshold amount of queries. In some examples, the plurality of queries may be ranked based upon a plurality of monetization scores associated with the plurality of queries. For example, one or more queries of the plurality of queries having rankings higher than other queries of the plurality of queries may be selected for inclusion in the first search history profile. Alternatively and/or additionally, an amount of queries of the first search history profile may not be limited (by the second threshold amount of queries).

In some examples, a fourth web page may be accessed by the third client device. The fourth web page may be associated with the content system. For example, the content system may provide content items to be presented via the fourth web page (and/or other web pages associated with the content system). At 470, a second request for content may be received from the third client device. In some examples, the second request may comprise the identifier associated with the third client device. In some examples, the first search history profile may be identified based upon the identifier.

At 472, responsive to receiving the second request for content, a first content item may be selected from the content items database based upon the first query. Alternatively and/or additionally, the first content item may be selected based upon the first search history profile. In some examples, it may be determined that the first query is ranked higher than other queries comprised within the first search history profile. Accordingly, the first content item may be selected from the content items database based upon the first query (e.g., a subject matter of the first content item may be determined to match and/or be associated with the first query).

At 474, the first content item may be transmitted to the third client device. For example, the first content item may be presented to the third user (and/or a fourth user) via the third client device (automatically while the fourth web page is accessed by the third client device and/or while the third user and/or the fourth user interact with the fourth web page).

FIGS. 5A-5E illustrate examples of a system 501 for transmitting content items using search history profiles. A user, such as user Jane, may access and/or interact with a service, such as a browser, an application, etc. that provides a platform for viewing and/or downloading content from one or more first servers 528 (illustrated in FIG. 5C) associated with a content system, on a device 500 of the user.

Figure 5A:
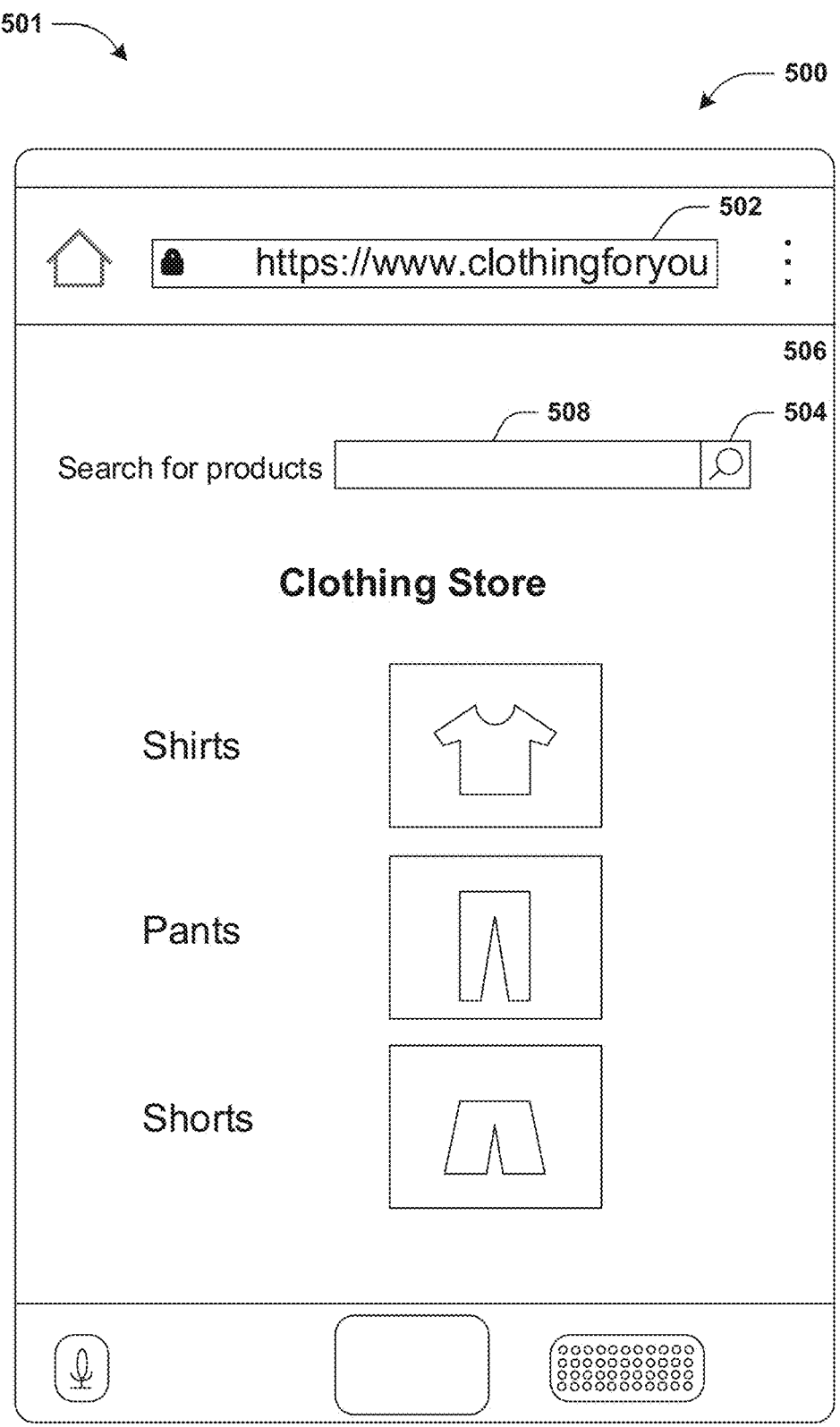
FIG. 5A is a component block diagram illustrating an example system for transmitting content items using search history profiles, where a device presents and/or accesses a first web page using a browser of the device.

FIG. 5A illustrates the device 500 presenting and/or accessing a first web page 506 using the browser of the device 500. The browser may comprise an address bar 502 comprising a web address (e.g., a URL) of the first web page 506. The first web page 506 may comprise a search interface. For example, the search interface may be an internal website search interface designed to search for information comprised within a first website associated with the first web page 506. In some examples, the first web page 506 may comprise a search field 508. For example, a query "T Shirts" may be entered into the search field 508. In some examples, the first web page 506 may comprise a search selectable input 504 corresponding to performing a search based upon the query. For example, the search selectable input 504 may be selected.

Figure 5B:
FIG. 5B is a component block diagram illustrating an example system for transmitting content items using search history profiles, where a device presents a plurality of search results associated with a query using a browser of the device.

FIG. 5B illustrates the device 500 presenting a plurality of search results associated with the query using the browser of the device 500. For example, the plurality of search results may be presented within a second web page 516. For example, the plurality of search results may comprise a first search result 510 corresponding to a third web page, a second search result 512 corresponding to a fourth web page and/or a third search result 514 corresponding to a fifth web page. In some examples, each search result of the plurality of search results may comprise a selectable input (e.g., "View Product") corresponding to accessing a web page associated with the search result. In some examples, the first search result 510 corresponding to the third web page may be selected (e.g., the first search result 510 may be selected via a second selectable input corresponding to the first search result 510). In some examples, responsive to the first search result 510 being selected, a first request to access the third web page may be transmitted by the device 500 to one or more second servers 520 (illustrated in FIG. 5C) associated with the first website and/or the third web page.

Figure 5C:
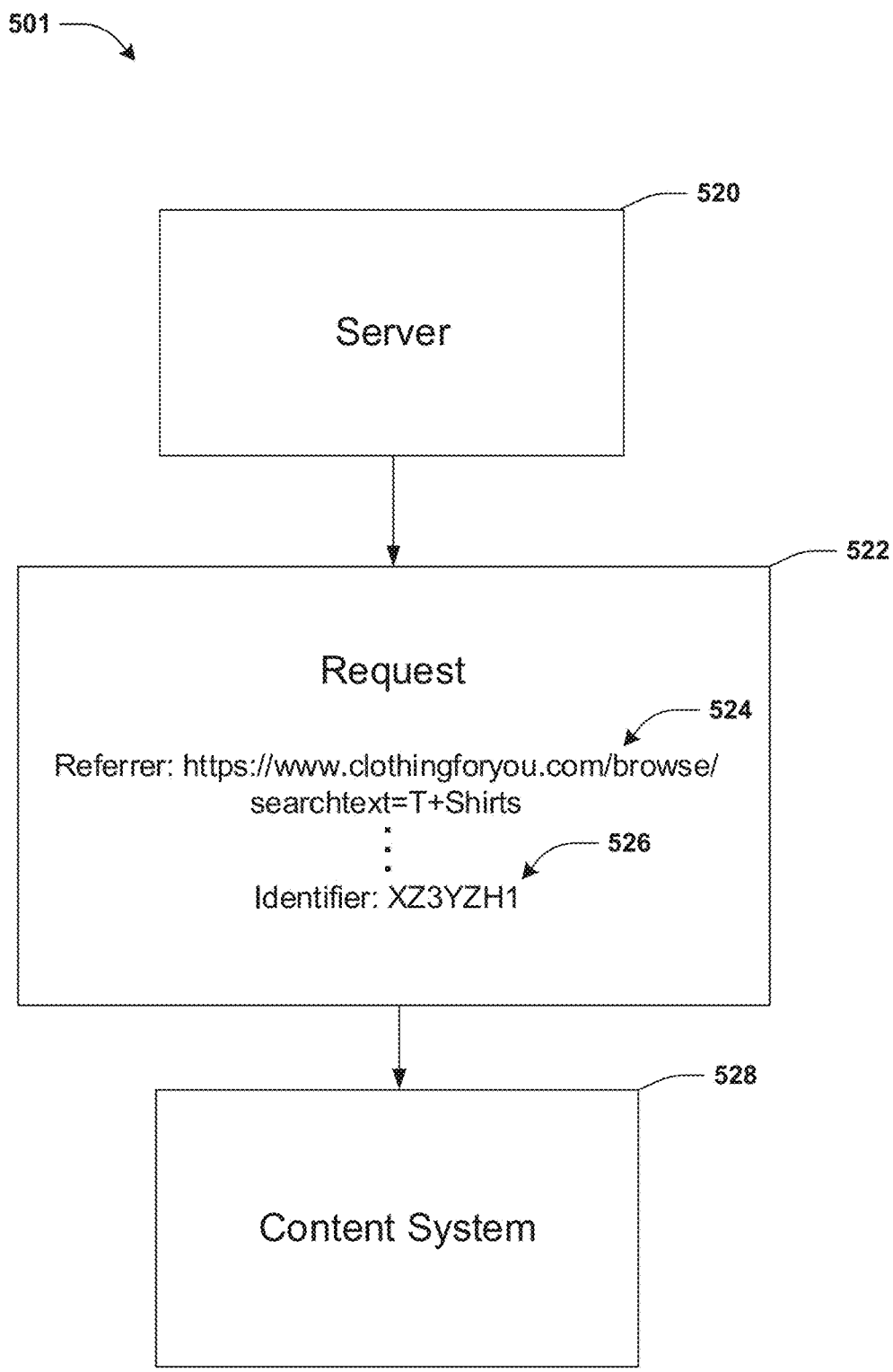
FIG. 5C is a component block diagram illustrating an example system for transmitting content items using search history profiles, where a request is transmitted by one or more second servers to one or more first servers.

FIG. 5C illustrates a second request 522 being transmitted by the one or more second servers 520 to the one or more first servers 528. In some examples, contents of the second request 522 may be the same as contents of the first request. Alternatively and/or additionally, contents of the second request 522 may be different than the contents of first request. In some examples, the second request 522 may be generated (by the one or more second servers 520) based upon the first request. For example, the second request 522 may comprise a representation of the first request. For example, the second request 522 may comprise one or more parts of the first request. For example, the second request 522 may comprise an indication of a referrer web address 524 associated with the second web page 516, an identifier 526 of the device 500, a cookie and/or other information comprised within the first request.

Figure 5D:
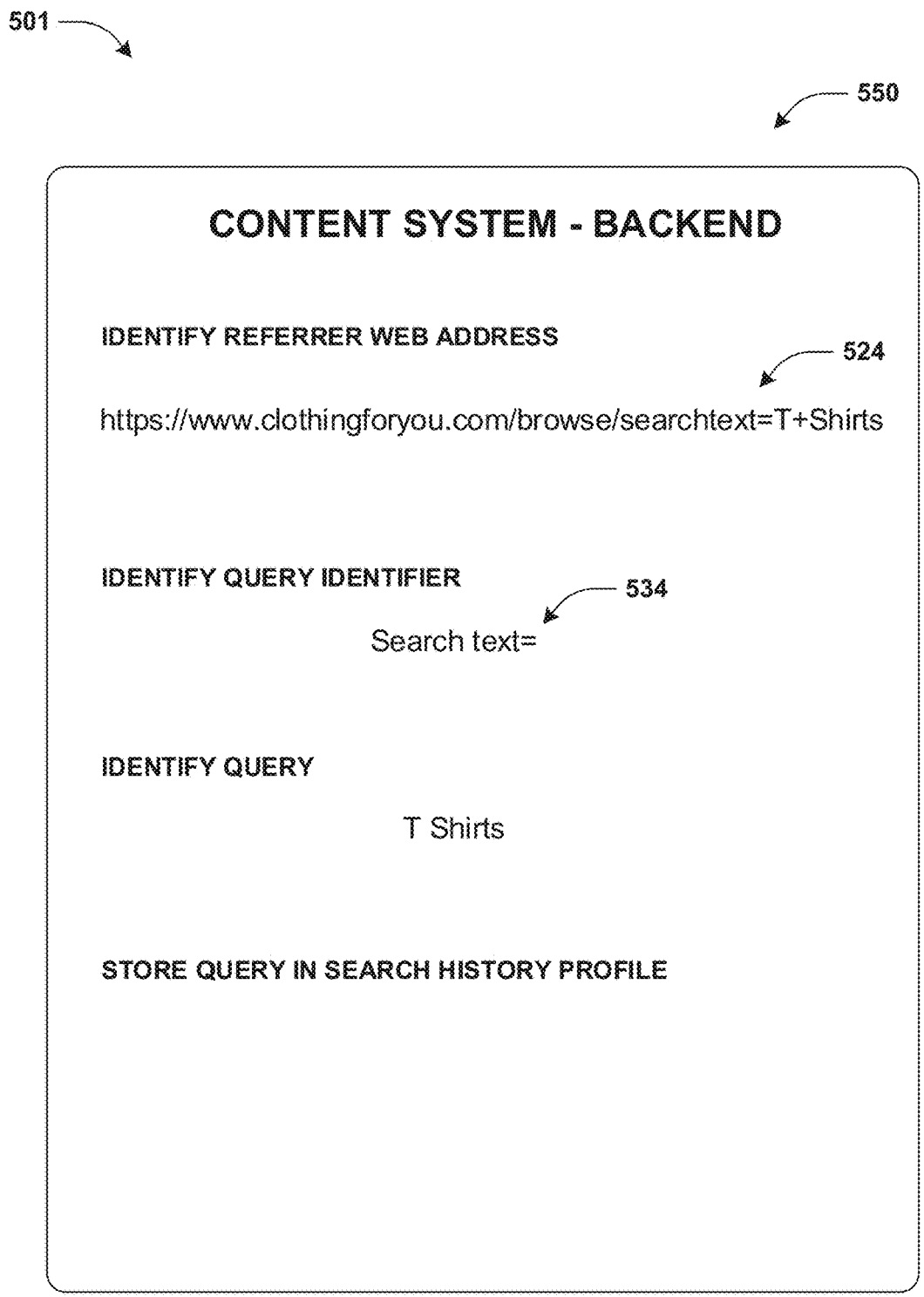
FIG. 5D is a component block diagram illustrating an example system for transmitting content items using search history profiles, where a backend system determines a query based upon a second request.

FIG. 5D illustrates a backend system 550 (e.g., the backend system 550 may be on the one or more first servers 528) that may determine the query based upon the second request 522. For example, the referrer web address 524 may be identified. The referrer web address 524 may be analyzed to determine a query identifier 534 associated with the referrer web address 524. The query "T Shirts" may be determined by identifying the query based upon a location of the query, in the referrer web address 524, with respect to the query identifier 534. In some examples, the query may be stored in a search history profile associated with the device 500. For example, the search history profile may be identified based upon the identifier 526 and/or the second request 522.

Figure 5E:
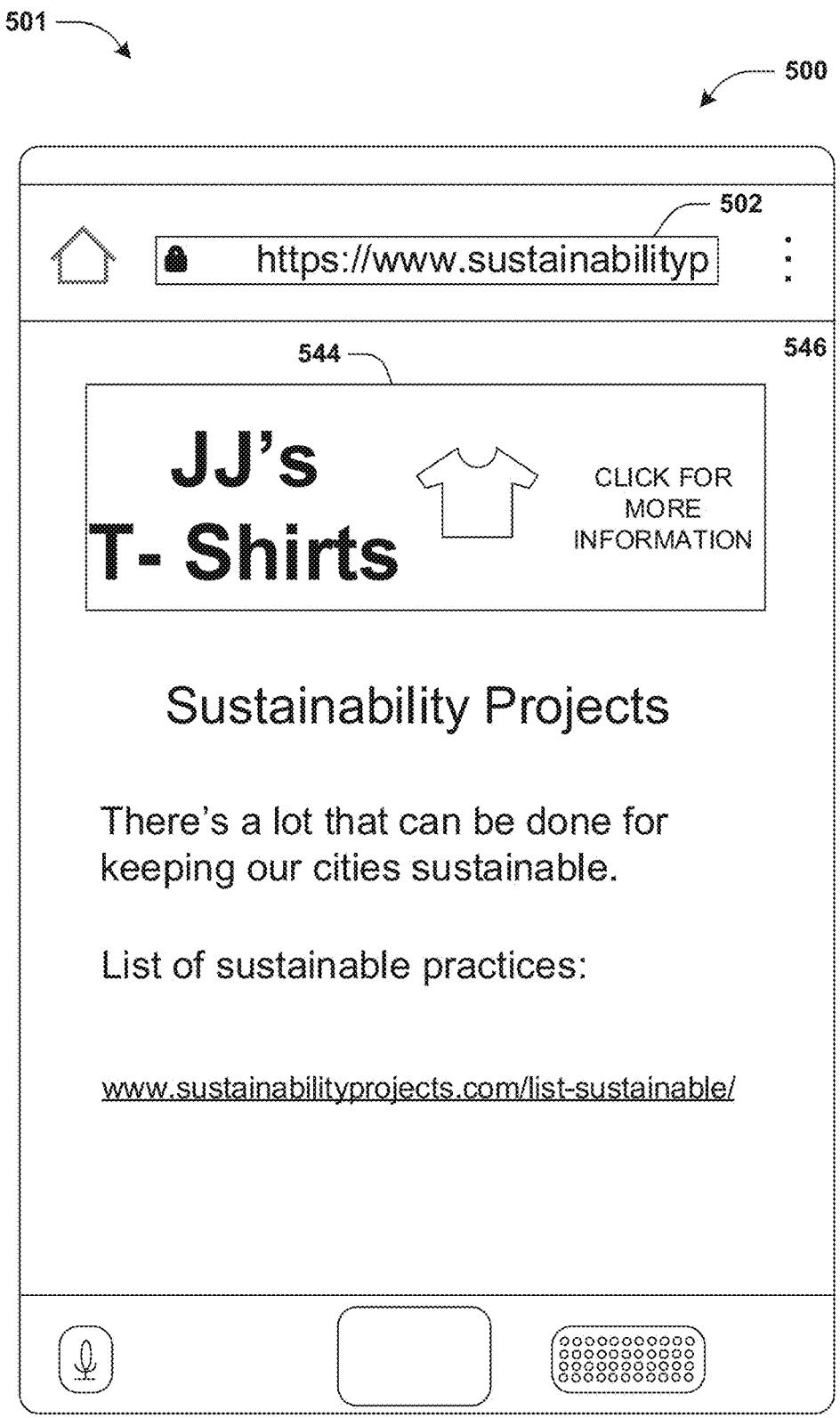
FIG. 5E is a component block diagram illustrating an example system for transmitting content items using search history profiles, where a device presented and/or accesses a sixth web page comprising a first content item using a browser of the device.

FIG. 5E illustrates the device 500 presenting and/or accessing a sixth web page 546 comprising a first content item 544 using the browser of the device 500. In some examples, the sixth web page 546 may be accessed by the device 500. The sixth web page 546 may be associated with the content system. For example, the content system may provide content items to be presented via the sixth web page 546. For example, a third request for content may be received from the device 500. In some examples, responsive to receiving the third request for content, the first content item 544 may be selected from a content items database based upon the query and/or the search history profile. For example, the first content item 544 may be transmitted to the device 500 and/or may be presented while the sixth web page 546 is accessed by the device 500.

FIGS. 6A-6D illustrate examples of a system 601 for transmitting content items using search history profiles. A first user, such as user John, may access and/or interact with a service, such as a browser, an application, etc. that provides a platform for viewing and/or downloading content from one or more first servers associated with a content system, on a first device 600 of the first user.

Figure 6A:
FIG. 6A is a component block diagram illustrating an example system for transmitting content items using search history profiles, where a device presents and/or accesses a first web page using a browser of the device.

FIG. 6A illustrates the first device 600 presenting and/or accessing a first web page 608 using the browser of the first device 600. The browser may comprise an address bar 602 comprising a web address (e.g., a URL) of the first web page 608. The first web page 608 may comprise a search interface. For example, the search interface may comprise a web search engine designed to search for information throughout the internet. In some examples, the first web page 608 may comprise a search field 606. For example, a query "stock market" may be entered into the search field 606. In some examples, the first web page 608 may comprise a search selectable input 604 corresponding to performing a search based upon the query. For example, the search selectable input 604 may be selected.

Figure 6B:
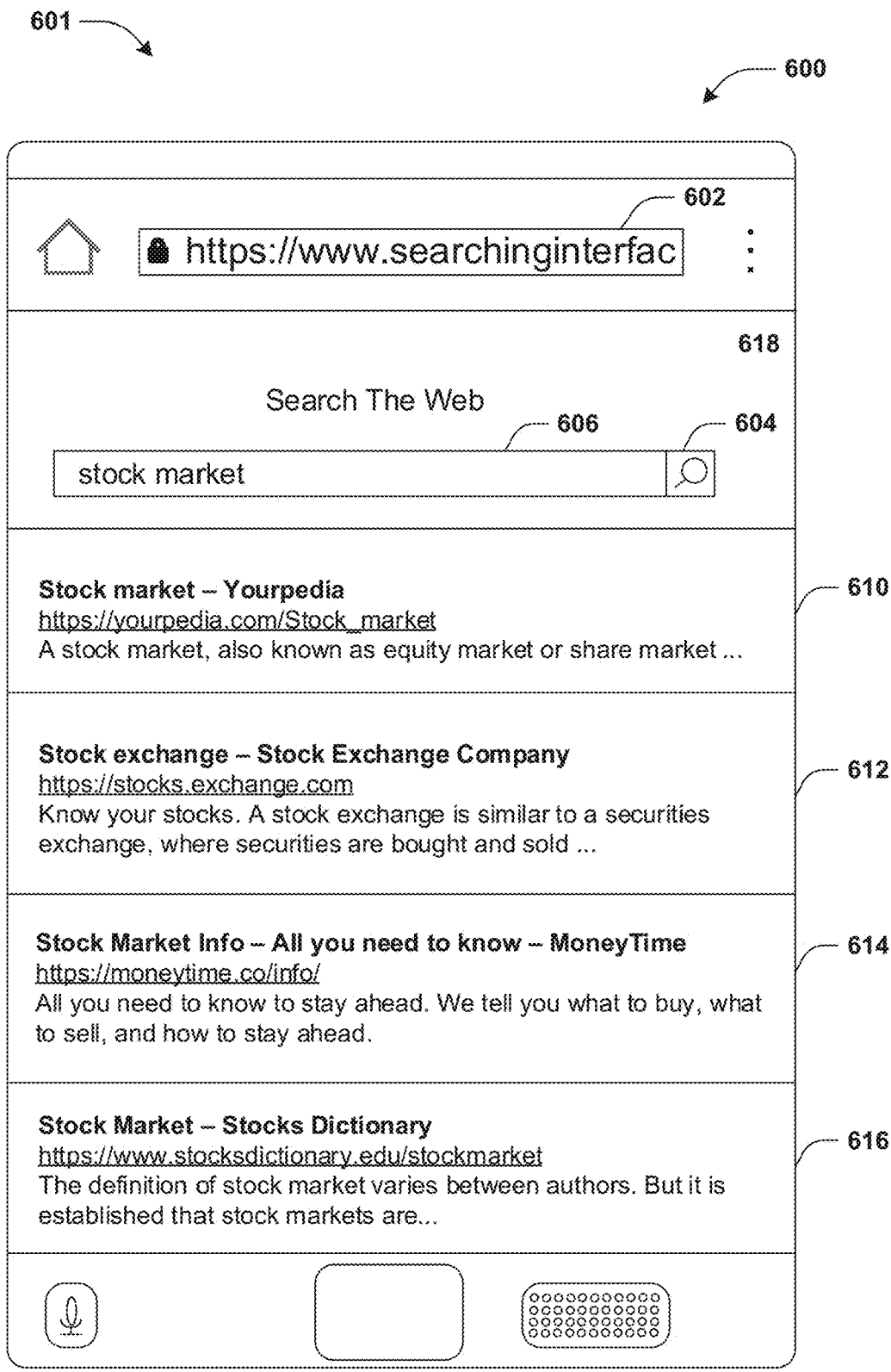
FIG. 6B is a component block diagram illustrating an example system for transmitting content items using search history profiles, where a device presents a plurality of search results associated with a query using a browser of the device.

FIG. 6B illustrates the device 600 presenting a plurality of search results associated with the query using the browser of the device 600. For example, the plurality of search results may be presented within a second web page 618. For example, the plurality of search results may comprise a first search result 610 corresponding to a third web page, a second search result 612 corresponding to a fourth web page 620 (illustrated in FIG. 6C), a third search result 614 corresponding to a fifth web page and/or a fourth search result 616 corresponding to a sixth web page. In some examples, each search result of the plurality of search results may comprise a selectable input (e.g., a link) corresponding to accessing a web page associated with the search result. In some examples, the second search result 612 corresponding to the fourth web page 620 may be selected (e.g., the second search result 612 may be selected via a second selectable input corresponding to the second search result 612). In some examples, responsive to the second search result 612 being selected, an indication that the query is linked with the fourth web page 620 may be stored in a referral query database. For example, the referral query database may comprise a plurality of sets of queries, wherein each set of queries may correspond to a web page of a plurality of web pages associated with the referral query database. For example, the referral query database may comprise a first set of queries, of the plurality of sets of queries, associated with the fourth web page 620. For example, the first set of queries may comprise the query.

Figure 6C:
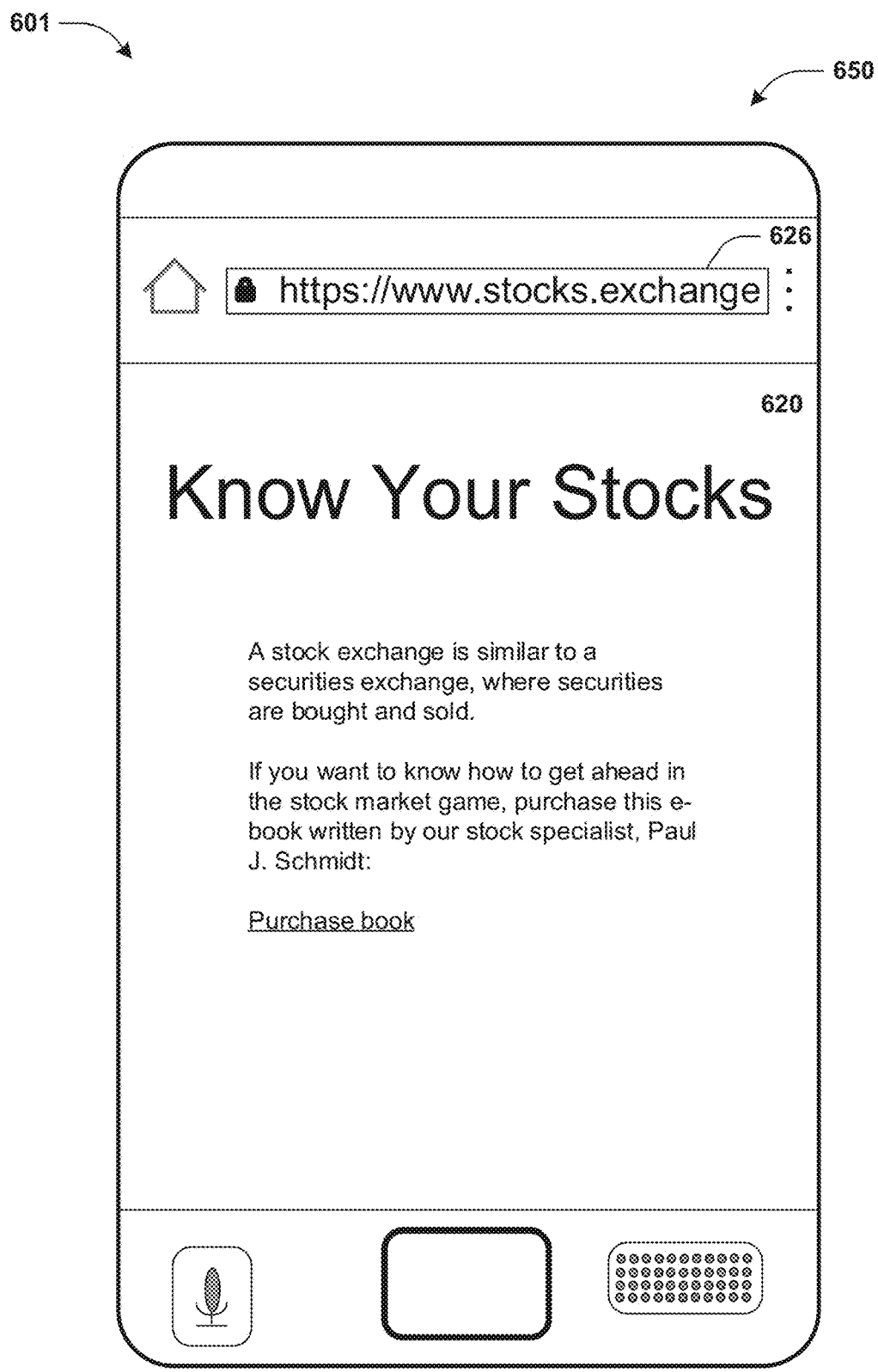
FIG. 6C is a component block diagram illustrating an example system for transmitting content items using search history profiles, where a second device presents and/or accesses a fourth web page using a second browser of the second device.

FIG. 6C illustrates a second device 650 presenting and/or accessing the fourth web page 620 using a second browser of the second device 650. For example, the second browser may comprise a second address bar 626 comprising a second web address of the fourth web page 620. Responsive to the second device 650 accessing the fourth web page 620 a message indicative of the second device 650 accessing the fourth web page 620 may be received by the content system. In some examples, it may be determined that the second device 650 did not access the fourth web page 620 via the search interface. In some examples, responsive to determining that the second device 650 did not access the fourth web page 620 via the search interface, the referral query database may be analyzed to determine that the fourth web page 620 is linked with the query and/or the first set of queries (comprising the query). An indication of the query and/or one or more indications of the first set of queries may be stored in a search history profile associated with the second device 650.

Figure 6D:
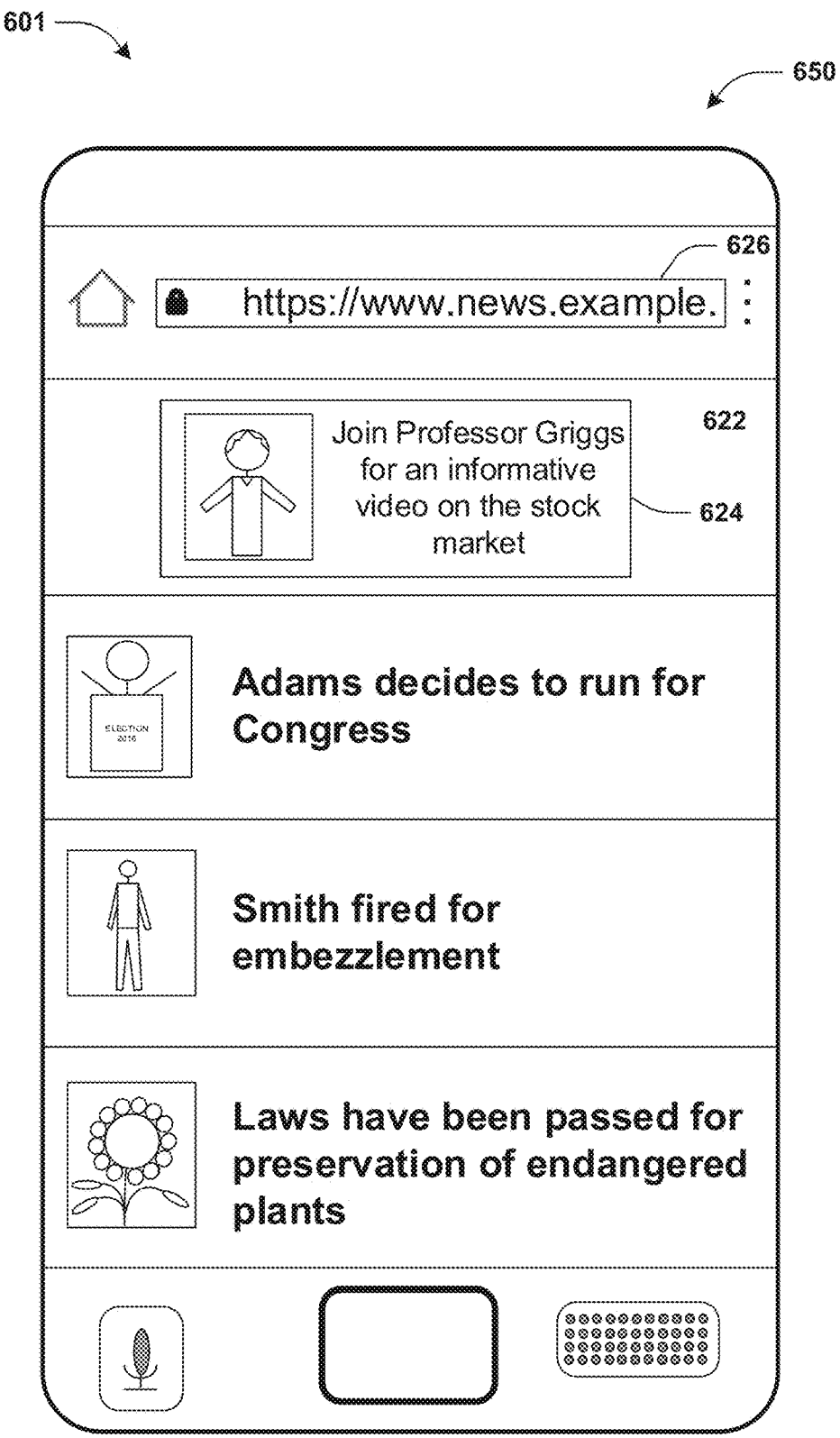
FIG. 6D is a component block diagram illustrating an example system for transmitting content items using search history profiles, where a second device presents and/or accesses a seventh web page comprising a first content item using a browser of the second device.

FIG. 6D illustrates the second device 650 presenting and/or accessing a seventh web page 622 comprising a first content item 624 using the second browser of the second device 650. In some examples, the seventh web page 622 may be associated with the content system. For example, the content system may provide content items to be presented via the seventh web page 622. For example, a request for content may be received from the second device 650. In some examples, responsive to receiving the request for content, the first content item 624 may be selected from a content items database based upon the query, the first set of queries and/or the search history profile. For example, the first content item 624 may be transmitted to the second device 650 and/or may be presented while the seventh web page 622 is accessed by the device 650.

It may be appreciated that the disclosed subject matter may assist a user (and/or a client device associated with the user) in viewing and/or consuming content associated with subject matter that the user has an interest in.

Implementation of at least some of the disclosed subject matter may lead to benefits including, but not limited to, a technical improvement to the functionality of a computer-implemented search engine and/or a computer-implemented content provider, and/or a reduction in screen space and/or an improved usability of a display (e.g., of the client device) (e.g., as a result of enabling the user to automatically access and/or consume content associated with subject matter that the user has an interest in, wherein the user may not view content that the user does not have an interest in, wherein the user may not need to open a separate application and/or a separate window in order to find content having the subject matter that the user has an interest in, etc.).

Alternatively and/or additionally, implementation of at least some of the disclosed subject matter may lead to benefits including a reduction in bandwidth (e.g., as a result of reducing a need for the user to open a separate application and/or a separate window in order to search throughout the internet and/or navigate through internet content to find content that the user has an interest in).

Alternatively and/or additionally, implementation of at least some of the disclosed subject matter may lead to benefits including more accurate and precise identification and/or transmission of content to intended users (e.g., as a result of automatically determining queries associated with users, as a result of the queries being determined without a need for the users performing searches using a specific search interface, as a result of transmitting content to each user based upon the queries, etc.).

In some examples, at least some of the disclosed subject matter may be implemented on a client device, and in some examples, at least some of the disclosed subject matter may be implemented on a server (e.g., hosting a service accessible via a network, such as the Internet).

Figure 7:
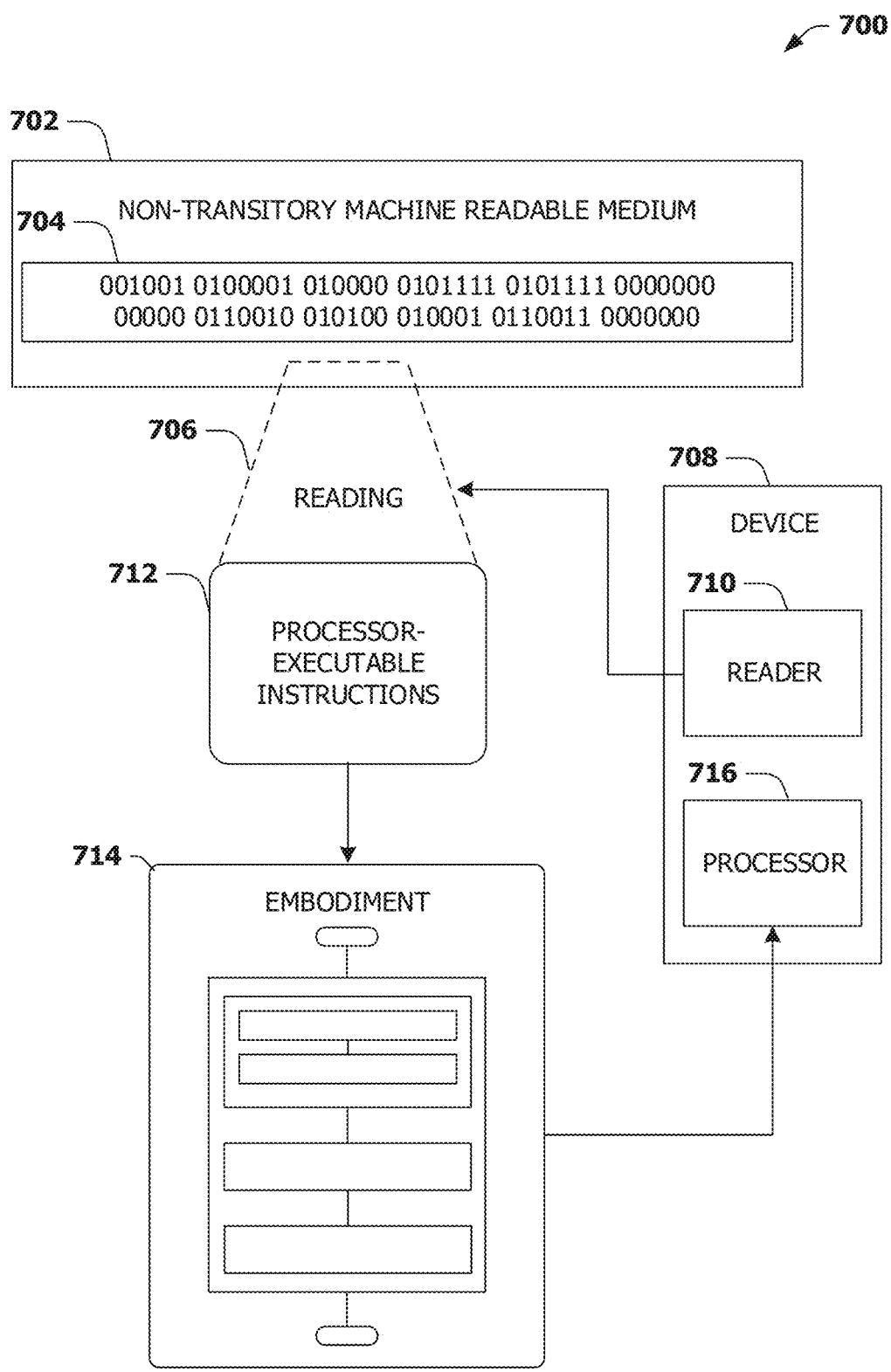
FIG. 7 is an illustration of a scenario featuring an example non-transitory machine readable medium in accordance with one or more of the provisions set forth herein.

FIG. 7 is an illustration of a scenario 700 involving an example non-transitory machine readable medium 702. The non-transitory machine readable medium 702 may comprise processor-executable instructions 712 that when executed by a processor 716 cause performance (e.g., by the processor 716) of at least some of the provisions herein (e.g., embodiment 714). The non-transitory machine readable medium 702 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 702 stores computer-readable data 704 that, when subjected to reading 706 by a reader 710 of a device 708 (e.g., a read head of a hard disk drive, or a read operation invoked on a solid-state storage device), express the processor-executable instructions 712. In some embodiments, the processor-executable instructions 712, when executed, cause performance of operations, such as at least some of the example method 400 of FIG. 4A, and/or the example method 450 of FIGS. 4B-4C, for example. In some embodiments, the processor-executable instructions 712 are configured to cause implementation of a system, such as at least some of the example system 501 of FIGS. 5A-5E, and/or the example system 601 of FIGS. 6A-6D for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an"

as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
   receiving, by an online advertising system, a first request from one or more servers hosting a web page,
   wherein the first request comprises a representation of a previous request, from a first device to the one or more servers hosting the web page, to access the web page,
   wherein the first request comprises a referrer web address,
   wherein the referrer web address comprises a query identifier and a set of characters associated with a query;
   analyzing, by the online advertising system, the first request, comprising the representation of the previous request to access the web page, to determine the query that the one or more servers previously received from the first device and used to determine search results indicative of the web page for presentation to the first device,
   wherein the analyzing the first request to determine the query comprises:
      comparing one or more parts of the referrer web address with a list of query identifiers to identify the query identifier based upon a determination that the query identifier is comprised within the list of query identifiers; and
      identifying the set of characters associated with the query based upon a location of the set of characters, in the referrer web address, with respect to the query identifier;
   storing, by the online advertising system and in a search history profile associated with the first device, a representation of the query that the one or more servers previously received from the first device and used to determine the search results indicative of the web page for presentation to the first device, wherein the search history profile comprises indications of a plurality of queries;
   receiving, by the online advertising system, a second request for content from a second device associated with the search history profile;
   responsive to receiving the second request for content, selecting, by the online advertising system, a content item from a content items database based upon the query; and
   transmitting, by the online advertising system, the content item to the second device.

2. The method of claim 1, wherein
the first request is received responsive to a selection of a link, to the web page, comprised within a second web page.

3. The method of claim 2, wherein the referrer web address is associated with the second web page.

4. The method of claim 3, wherein
the second web page comprises a plurality of search results generated based upon the query, wherein the link to the web page corresponds to a search result of the plurality of search results.

5. The method of claim 1, comprising:
analyzing the query to determine a monetization score associated with the query.

6. The method of claim 5,
wherein the storing the representation of the query in the search history profile is performed responsive to determining that the monetization score is higher than a threshold monetization score.

7. The method of claim 1, comprising:
analyzing the query to determine one or more characteristics of the query, wherein the storing the representation of the query in the search history profile is performed responsive to determining that at least one of:
a search frequency associated with the query among a plurality of devices is less than a search frequency threshold;
the query does not comprise a web address;
the query does not comprise a non-American Standard Code for Information Interchange (ASCII) character;
the query comprises less than a maximum number of words;
the query comprises less than a maximum number of characters;
the query comprises more than a minimum number of characters;
the query is not blacklisted; or
the query comprises one or more letters.

8. The method of claim 1, comprising:
analyzing the query to determine one or more misspellings of the query; and
correcting the one or more misspellings to generate a modified query, wherein the representation of the query comprises the modified query.

9. The method of claim 1, wherein the second device is the same as the first device.

10. The method of claim 1, wherein the second device is different than the first device.

11. A non-transitory machine readable medium having stored thereon processor-executable instructions that when executed cause performance of operations, the operations comprising:
controlling a graphical user interface of a first device to display a search interface;
receiving a first query, via the search interface, from the first device;
responsive to receiving the first query, controlling the graphical user interface to display a plurality of search results corresponding to a plurality of web pages associated with the first query;
receiving a selection, from the first device, of a first search result, of the plurality of search results, corresponding to a first web page of the plurality of web pages;
responsive to receiving the selection of the first search result from the first device, storing, in a referral query database, an indication that the first query received from the first device is linked with the first web page associated with the first search result selected by the first device;
receiving a message indicative of a second device accessing the first web page;
determining that the second device did not access the first web page via the search interface;
responsive to determining that the second device did not access the first web page via the search interface, analyzing the referral query database to determine, based upon the indication that the first query is linked with the first web page stored in the referral query database responsive to receiving the selection of the first search result from the first device, that the first web page accessed by the second device without the search interface is linked with the first query received from the first device via the search interface;
responsive to determining that the first web page accessed by the second device without the search interface is linked with the first query received from the first device via the search interface, storing an indication of the first query in a search history profile associated with the second device;
receiving a request for content from the second device;
responsive to receiving the request for content, selecting a content item from a content items database based upon the first query;
transmitting the content item to the second device;
receiving a second request,
wherein the second request comprises a referrer web address,
wherein the referrer web address comprises a query identifier and a set of characters associated with a second query;
analyzing the second request to determine the second query,
wherein the analyzing the second request to determine the second query comprises:
comparing one or more parts of the referrer web address with a list of query identifiers to identify the query identifier based upon a determination that the query identifier is comprised within the list of query identifiers; and
identifying the set of characters associated with the second query based upon a location of the set of characters, in the referrer web address, with respect to the query identifier; and
storing, in the search history profile, an indication of the second query.

12. The non-transitory machine readable medium of claim 11, wherein the storing the indication of the first query in the search history profile is performed responsive to a determination that the search history profile comprises less than a threshold amount of queries.

13. The non-transitory machine readable medium of claim 11, the operations comprising:
controlling a second graphical user interface of a third device to display the search interface;
receiving a third query, via the search interface, from the third device;
responsive to receiving the third query, controlling the second graphical user interface to display a second plurality of search results corresponding to a second plurality of web pages associated with the third query;
receiving a selection of a second search result, of the second plurality of search results, corresponding to the first web page;
responsive to receiving the selection of the second search result, storing an indication that the third query is linked with the first web page in the referral query database; and
assigning a first ranking to the first query and a second ranking to the third query, wherein the storing the first query in the search history profile associated with the second device is performed based upon a determination that the first ranking of the first query is higher than the second ranking of the third query.

14. The non-transitory machine readable medium of claim 11, the operations comprising:
analyzing the first query to determine a monetization score associated with the first query, wherein the storing the indication that the first query is linked with the first web page in the referral query database is performed responsive to determining that the monetization score is higher than a threshold monetization score.

15. The non-transitory machine readable medium of claim 11, the operations comprising:
analyzing the first query to determine one or more characteristics of the first query, wherein the storing the indication that the first query is linked with the first web page in the referral query database is performed responsive to determining that at least one of:
a search frequency associated with the first query among a plurality of devices is less than a search frequency threshold;
the first query does not comprise a web address;
the first query does not comprise a non-American Standard Code for Information Interchange (ASCII) character;
the first query comprises less than a maximum number of words;
the first query comprises less than a maximum number of characters;
the first query comprises more than a minimum number of characters;
the first query is not blacklisted; or
the first query comprises one or more letters.

16. A computing device comprising:
a processor; and
memory comprising processor-executable instructions that when executed by the processor cause performance of operations, the operations comprising:
receiving, by a content system, a first request from one or more servers hosting a web page,
wherein the first request comprises a representation of a second request, from a first device to the one or more servers hosting the web page, to access the web page,
wherein the first request comprises a referrer web address,
wherein the referrer web address comprises a query identifier and a set of characters associated with a query;
analyzing, by the content system, the first request, comprising the representation of the second request to access the web page, to determine the query that the one or more servers at least one of received from the first device or used to determine the web page, wherein the analyzing the first request to determine the query comprises:
comparing one or more parts of the referrer web address with a list of query identifiers to identify the query identifier based upon a determination that the query identifier is comprised within the list of query identifiers; and
identifying the set of characters associated with the query based upon a location of the set of characters, in the referrer web address, with respect to the query identifier;
storing, by the content system and in a search history profile associated with the first device, a representation of the query that the one or more servers at least one of received from the first device or used to determine the web page;
receiving, by the content system, a second request for content from a second device associated with the search history profile;
responsive to receiving the second request for content, selecting, by the content system, a content item from a content items database based upon the query; and
transmitting, by the content system, the content item to the second device.

17. The computing device of claim 16, wherein the first request is received responsive to a selection of a link, to the web page, comprised within a second web page.

18. The computing device of claim 17, wherein the referrer web address is associated with the second web page.

19. The computing device of claim 18, wherein the second web page comprises a plurality of search results generated based upon the query, wherein the link to the web page corresponds to a search result of the plurality of search results.

20. The computing device of claim 16, comprising:
analyzing the query to determine at least one of a monetization score associated with the query or one or more characteristics of the query, wherein the storing the representation of the query in the search history profile is performed based upon at least one of the monetization score or the one or more characteristics of the query.

* * * * *